US012805981B2

(12) United States Patent
Tong et al.

(10) Patent No.: US 12,805,981 B2
(45) Date of Patent: Nov. 24, 2026

(54) NON-SLIDING ORTHODONTIC ARCHFORMS

(71) Applicant: Lorelli Technologies LLC, N. Babylon, NY (US)

(72) Inventors: Hongsheng Tong, Yorba Linda, CA (US); Todd Oda, Torrance, CA (US); Scott C. Schwartz, North Babylon, NY (US); Andres Rodriguez, La Verne, CA (US)

(73) Assignee: Lorelli Technologies LLC, N. Babylon, NY (US)

( * ) Notice: Subject to any disclaimer, the term of this patent is extended or adjusted under 35 U.S.C. 154(b) by 508 days.

(21) Appl. No.: 18/466,324

(22) Filed: Sep. 13, 2023

(65) Prior Publication Data

US 2024/0090980 A1 Mar. 21, 2024

Related U.S. Application Data

(60) Provisional application No. 63/375,832, filed on Sep. 15, 2022.

(51) Int. Cl.
*A61C 7/20* (2006.01)

(52) U.S. Cl.
CPC .................................... *A61C 7/20* (2013.01)

(58) Field of Classification Search
CPC .... A61C 7/12; A61C 7/14; A61C 7/28; A61C 7/34; A61C 7/20
See application file for complete search history.

(56) References Cited

U.S. PATENT DOCUMENTS

| | | | |
|---|---|---|---|
| 1,005,131 | A | 10/1911 | Angle et al. |
| 1,108,493 | A | 8/1914 | Federspiel |
| 1,307,382 | A | 6/1919 | Stanton |
| 1,323,141 | A | 11/1919 | Young |
| 1,429,749 | A | 9/1922 | Maeulen et al. |
| 1,638,006 | A | 8/1927 | Aderer |
| 2,257,069 | A | 9/1941 | Peak |

(Continued)

FOREIGN PATENT DOCUMENTS

| | | |
|---|---|---|
| CN | 1372872 | 10/2002 |
| CN | 201079455 | 7/2008 |

(Continued)

OTHER PUBLICATIONS

Coro, Jorge C. et al., "MEAW Therapy" MEAW Therapy-Orthodontic Products, accessed via http://www.orthodonticproductsonline.com/2012/11/meaw-therapy/ on Mar. 14, 2016, published Nov. 12, 2012 in 6 pages.

(Continued)

*Primary Examiner* — Ralph A Lewis

(74) *Attorney, Agent, or Firm* — Knobbe, Martens, Olson & Bear, LLP

(57) ABSTRACT

An archform configured to move a patient's teeth using non-sliding mechanics. The archform can include a double loop between two bracket connectors. The archform can include one or more hooks extending from bracket connectors to couple with elastics. The archform can include narrowed-width bracket connectors for overcrowded teeth. The archform can include interproximal segments between adjacent bracket connectors that include multiple interproximal members.

20 Claims, 13 Drawing Sheets

(56) References Cited

U.S. PATENT DOCUMENTS

| | | | | | |
|---|---|---|---|---|---|
| 2,495,692 | A | | 1/1950 | Brusse | |
| 2,524,763 | A | | 10/1950 | Brusse | |
| 2,582,230 | A | | 1/1952 | Brusse | |
| 3,087,245 | A | | 4/1963 | Asher | |
| 3,127,677 | A | | 4/1964 | Schachter | |
| 3,256,602 | A | | 6/1966 | Broussard | |
| 3,262,207 | A | | 7/1966 | Kesling | |
| 3,374,542 | A | | 3/1968 | Moylan, Jr. | |
| 3,464,113 | A | | 9/1969 | Silverman et al. | |
| 3,593,421 | A | * | 7/1971 | Brader | A61C 7/20 433/21 |
| 3,600,808 | A | | 8/1971 | Reeve | |
| 3,683,502 | A | | 8/1972 | Wallshein | |
| 3,691,635 | A | | 9/1972 | Wallshein | |
| 3,762,050 | A | * | 10/1973 | Dal Pont | A61C 7/12 433/21 |
| 3,765,091 | A | | 10/1973 | Northcutt | |
| 3,878,610 | A | | 4/1975 | Coscina | |
| 3,936,938 | A | | 2/1976 | Northcutt | |
| 3,946,488 | A | | 3/1976 | Miller et al. | |
| 3,949,477 | A | | 4/1976 | Cohen et al. | |
| 3,975,823 | A | | 8/1976 | Sosnay | |
| 4,052,792 | A | | 10/1977 | Biederman | |
| 4,103,423 | A | | 8/1978 | Kessel | |
| 4,127,940 | A | | 12/1978 | Shilliday | |
| 4,171,568 | A | | 10/1979 | Forster | |
| 4,192,070 | A | | 3/1980 | Lemchen et al. | |
| 4,193,195 | A | | 3/1980 | Merkel et al. | |
| 4,197,643 | A | | 4/1980 | Burstone et al. | |
| 4,268,250 | A | | 5/1981 | Reeve | |
| 4,330,273 | A | | 5/1982 | Kesling | |
| 4,354,833 | A | | 10/1982 | Fujita | |
| 4,354,834 | A | | 10/1982 | Wilson | |
| 4,382,781 | A | | 5/1983 | Grossman | |
| 4,385,890 | A | | 5/1983 | Klein | |
| 4,412,819 | A | | 11/1983 | Cannon | |
| 4,416,627 | A | | 11/1983 | Beazley | |
| 4,424,033 | A | | 1/1984 | Wool | |
| 4,436,510 | A | | 3/1984 | Klein | |
| 4,479,779 | A | | 10/1984 | Wool | |
| 4,483,674 | A | | 11/1984 | Schütz | |
| 4,490,112 | A | | 12/1984 | Tanaka et al. | |
| 4,501,554 | A | | 2/1985 | Hickham | |
| 4,516,938 | A | | 5/1985 | Hall | |
| 4,529,382 | A | | 7/1985 | Creekmore | |
| 4,533,320 | A | | 8/1985 | Piekarsky | |
| 4,561,844 | A | | 12/1985 | Bates | |
| 4,580,976 | A | | 4/1986 | O'Meara | |
| 4,582,487 | A | | 4/1986 | Creekmore | |
| 4,585,414 | A | | 4/1986 | Kottermann | |
| 4,592,725 | A | | 6/1986 | Goshgarian | |
| 4,634,662 | A | | 1/1987 | Rosenberg | |
| 4,656,860 | A | | 4/1987 | Orthuber et al. | |
| 4,659,310 | A | | 4/1987 | Kottermann | |
| 4,664,626 | A | | 5/1987 | Kesling | |
| 4,674,978 | A | | 6/1987 | Acevedo | |
| 4,676,747 | A | | 6/1987 | Kesling | |
| 4,725,229 | A | | 2/1988 | Miller | |
| 4,797,093 | A | | 1/1989 | Bergersen | |
| 4,797,095 | A | | 1/1989 | Armstrong et al. | |
| 4,838,787 | A | | 6/1989 | Lerner | |
| 4,842,512 | A | | 6/1989 | Kesling | |
| 4,842,514 | A | | 6/1989 | Kesling | |
| 4,872,449 | A | | 10/1989 | Beeuwkes | |
| 4,881,896 | A | | 11/1989 | Bergersen | |
| 4,892,479 | A | | 1/1990 | McKenna | |
| 4,897,035 | A | | 1/1990 | Green | |
| 4,900,251 | A | | 2/1990 | Andreasen | |
| 4,941,825 | A | | 7/1990 | Lerner | |
| 4,978,323 | A | | 12/1990 | Freedman | |
| 5,011,405 | A | | 4/1991 | Lemchen | |
| 5,017,133 | A | | 5/1991 | Miura | |
| 5,037,297 | A | | 8/1991 | Lerner | |
| 5,044,947 | A | | 9/1991 | Sachdeva et al. | |
| 5,055,039 | A | | 10/1991 | Abbatte et al. | |
| 5,092,768 | A | | 3/1992 | Korn | |
| 5,092,941 | A | | 3/1992 | Miura | |
| 5,114,339 | A | | 5/1992 | Guis | |
| 5,123,838 | A | | 6/1992 | Cannon | |
| 5,125,832 | A | | 6/1992 | Kesling | |
| 5,127,828 | A | | 7/1992 | Suyama | |
| 5,131,843 | A | | 7/1992 | Hilgers et al. | |
| 5,154,606 | A | | 10/1992 | Wildman | |
| 5,174,754 | A | | 12/1992 | Meritt | |
| 5,176,514 | A | | 1/1993 | Viazis | |
| 5,176,618 | A | | 1/1993 | Freedman | |
| 5,238,404 | A | | 8/1993 | Andreiko | |
| 5,242,304 | A | | 9/1993 | Truax et al. | |
| 5,246,366 | A | | 9/1993 | Tracey | |
| 5,248,257 | A | | 9/1993 | Cannon | |
| 5,259,760 | A | | 11/1993 | Orikasa | |
| 5,312,247 | A | | 5/1994 | Sachdeva et al. | |
| 5,344,315 | A | | 9/1994 | Hanson | |
| 5,368,478 | A | | 11/1994 | Andreiko | |
| D354,570 | S | | 1/1995 | Hilgers | |
| 5,380,197 | A | | 1/1995 | Hanson | |
| 5,399,087 | A | | 3/1995 | Arndt | |
| D357,537 | S | | 4/1995 | Hilgers | |
| 5,431,562 | A | | 7/1995 | Andreiko | |
| 5,447,432 | A | | 9/1995 | Andreiko | |
| 5,454,717 | A | | 10/1995 | Andreiko | |
| RE35,169 | E | | 3/1996 | Lemchen et al. | |
| 5,516,284 | A | | 5/1996 | Wildman | |
| 5,556,277 | A | | 9/1996 | Yawata et al. | |
| 5,624,258 | A | | 4/1997 | Wool | |
| 5,630,715 | A | | 5/1997 | Voudouris | |
| 5,683,243 | A | | 11/1997 | Andreiko | |
| 5,683,245 | A | | 11/1997 | Sachdeva et al. | |
| 5,722,827 | A | | 3/1998 | Allesee | |
| 5,727,941 | A | | 3/1998 | Kesling | |
| 5,816,800 | A | | 10/1998 | Brehm | |
| 5,820,370 | A | | 10/1998 | Brosius | |
| 5,863,198 | A | | 1/1999 | Doyle | |
| 5,890,893 | A | | 4/1999 | Heiser | |
| 5,971,754 | A | | 10/1999 | Sondhi et al. | |
| 5,975,893 | A | | 11/1999 | Chishti et al. | |
| 5,993,208 | A | | 11/1999 | Jonjic | |
| 6,015,289 | A | | 1/2000 | Andreiko | |
| 6,036,489 | A | | 3/2000 | Brosius | |
| 6,042,374 | A | | 3/2000 | Farzin-Nia et al. | |
| 6,086,364 | A | | 7/2000 | Brunson | |
| 6,089,861 | A | | 7/2000 | Kelly | |
| 6,095,809 | A | | 8/2000 | Kelly et al. | |
| 6,099,304 | A | | 8/2000 | Carter | |
| 6,123,544 | A | | 9/2000 | Cleary | |
| 6,183,250 | B1 | | 2/2001 | Kanno et al. | |
| 6,190,166 | B1 | * | 2/2001 | Sasakura | A61C 7/287 433/14 |
| 6,196,839 | B1 | | 3/2001 | Ross | |
| 6,213,767 | B1 | | 4/2001 | Dixon et al. | |
| 6,217,325 | B1 | | 4/2001 | Chishti et al. | |
| 6,227,850 | B1 | | 5/2001 | Chishti et al. | |
| 6,244,861 | B1 | | 6/2001 | Andreiko | |
| 6,250,918 | B1 | | 6/2001 | Sachdeva et al. | |
| 6,258,118 | B1 | | 7/2001 | Baum et al. | |
| 6,315,553 | B1 | | 11/2001 | Sachdeva et al. | |
| 6,318,994 | B1 | | 11/2001 | Chishti et al. | |
| 6,318,995 | B1 | | 11/2001 | Sachdeva et al. | |
| 6,334,853 | B1 | | 1/2002 | Kopelman et al. | |
| 6,350,120 | B1 | | 2/2002 | Sachdeva et al. | |
| 6,358,045 | B1 | | 3/2002 | Farzin-Nia et al. | |
| 6,371,761 | B1 | | 4/2002 | Cheang et al. | |
| 6,375,458 | B1 | | 4/2002 | Moorleghem et al. | |
| 6,394,801 | B2 | | 5/2002 | Chishti et al. | |
| 6,398,548 | B1 | | 6/2002 | Muhammad et al. | |
| 6,413,084 | B1 | | 7/2002 | Rubbert et al. | |
| 6,431,870 | B1 | | 8/2002 | Sachdeva | |
| 6,450,807 | B1 | | 9/2002 | Chishti et al. | |
| 6,464,495 | B1 | | 10/2002 | Voudouris | |
| 6,464,496 | B1 | | 10/2002 | Sachdeva et al. | |
| 6,471,511 | B1 | | 10/2002 | Chishti et al. | |
| 6,471,512 | B1 | | 10/2002 | Sachdeva et al. | |
| 6,512,994 | B1 | | 1/2003 | Sachdeva | |
| 6,514,074 | B1 | | 2/2003 | Chishti et al. | |

(56) References Cited

U.S. PATENT DOCUMENTS 6,532,299 B1 3/2003 Sachdeva et al.
6,540,512 B1 4/2003 Sachdeva et al.
6,554,611 B2 4/2003 Chishti et al.
6,554,613 B1 4/2003 Sachdeva et al.
6,572,693 B1 6/2003 Wu et al.
6,582,226 B2 6/2003 Jordan et al.
6,587,828 B1 7/2003 Sachdeva
6,595,774 B1 7/2003 Risse
6,602,070 B2 8/2003 Miller et al.
6,612,143 B1 9/2003 Butscher et al.
6,616,444 B2 9/2003 Andreiko
6,626,666 B2 9/2003 Chishti et al.
6,629,840 B2 10/2003 Chishti et al.
6,632,089 B2 10/2003 Rubbert
6,648,640 B2 11/2003 Rubbert
6,663,385 B2 12/2003 Tepper
6,679,700 B2 1/2004 McGann
6,682,344 B1 1/2004 Stockstill
6,685,469 B2 2/2004 Chishti et al.
6,685,470 B2 2/2004 Chishti et al.
6,688,885 B1 2/2004 Sachdeva et al.
6,699,037 B2 3/2004 Chishti et al.
6,702,575 B2 3/2004 Hilliard
6,705,863 B2 3/2004 Phan et al.
6,722,878 B2 4/2004 Graham
6,722,880 B2 4/2004 Chishti et al.
6,728,423 B1 4/2004 Rubbert et al.
6,729,876 B2 5/2004 Chishti et al.
6,732,558 B2 5/2004 Butscher et al.
6,733,285 B2 5/2004 Puttler et al.
6,733,287 B2 5/2004 Wilkerson
6,733,288 B2 5/2004 Vallittu et al.
6,736,638 B1 5/2004 Sachdeva et al.
6,738,508 B1 5/2004 Rubbert et al.
6,739,869 B1 5/2004 Taub et al.
6,744,914 B1 6/2004 Rubbert et al.
6,744,932 B1 6/2004 Rubbert et al.
6,746,241 B2 6/2004 Townsend-Hansen
6,755,064 B2 6/2004 Butscher
6,771,809 B1 8/2004 Rubbert et al.
6,776,614 B2 8/2004 Wiechmann
6,811,397 B2 11/2004 Wool
6,830,450 B2 12/2004 Knopp et al.
6,845,175 B2 1/2005 Kopelman et al.
6,846,179 B2 1/2005 Chapouland
6,851,949 B1 2/2005 Sachdeva et al.
6,860,132 B2 3/2005 Butscher
6,893,257 B2 5/2005 Kelly
6,928,733 B2 8/2005 Rubbert et al.
6,948,931 B2 9/2005 Chishti et al.
6,960,079 B2 11/2005 Brennan et al.
6,971,873 B2 12/2005 Sachdeva
6,976,627 B1 12/2005 Culp et al.
6,988,889 B2 1/2006 Abels
6,996,452 B2 2/2006 Erichsen et al.
7,008,221 B2 3/2006 McGann
7,013,191 B2 3/2006 Rubbert
7,020,963 B2 4/2006 Cleary et al.
7,029,275 B2 4/2006 Rubbert
7,033,171 B2 4/2006 Wilkerson
7,037,107 B2 5/2006 Yamamoto
7,056,115 B2 6/2006 Phan et al.
7,063,531 B2 6/2006 Maijer et al.
7,068,836 B1 6/2006 Rubbert et al.
7,076,980 B2 7/2006 Butscher
7,077,646 B2 7/2006 Hilliard
7,077,647 B2 7/2006 Choi et al.
7,080,979 B2 7/2006 Rubbert et al.
7,092,107 B2 8/2006 Babayoff et al.
7,094,053 B2 8/2006 Andreiko
7,112,065 B2 9/2006 Kopelman et al.
7,125,248 B2 10/2006 Phan et al.
7,134,874 B2 11/2006 Chishti et al.
7,137,812 B2 11/2006 Cleary et al.
7,155,373 B2 12/2006 Jordan et al.
7,156,661 B2 1/2007 Choi et al.
7,160,110 B2 1/2007 Imgrund et al.
7,168,950 B2 1/2007 Cinader, Jr. et al.
7,172,417 B2 2/2007 Sporbert et al.
7,175,428 B2 2/2007 Nicholson
7,186,115 B2 3/2007 Goldberg et al.
7,188,421 B2 3/2007 Cleary et al.
7,201,574 B1 4/2007 Wiley
7,204,690 B2 4/2007 Hanson et al.
7,214,056 B2 5/2007 Stockstill
7,229,282 B2 6/2007 Andreiko
7,234,934 B2 6/2007 Rosenberg
7,234,936 B2 6/2007 Lai
7,234,937 B2 6/2007 Sachdeva et al.
7,240,528 B2 7/2007 Weise et al.
7,244,121 B2 7/2007 Brosius
7,245,977 B1 7/2007 Simkins
7,252,506 B2 8/2007 Lai
7,267,545 B2 9/2007 Oda
7,283,891 B2 10/2007 Butscher
7,296,996 B2 11/2007 Sachdeva
7,335,021 B2 2/2008 Nikodem
7,347,688 B2 3/2008 Kopelman et al.
7,354,268 B2 4/2008 Raby et al.
7,357,634 B2 4/2008 Knopp
7,361,017 B2 4/2008 Sachdeva
7,364,428 B2 4/2008 Cinader, Jr. et al.
7,404,714 B2 7/2008 Cleary et al.
7,410,357 B2 8/2008 Cleary et al.
7,416,408 B2 8/2008 Farzin-Nia et al.
7,442,041 B2 10/2008 Imgrund et al.
7,452,205 B2 11/2008 Cinader, Jr. et al.
7,458,812 B2 12/2008 Sporbert et al.
7,469,783 B2 12/2008 Rose, Sr.
7,471,821 B2 12/2008 Rubbert et al.
7,473,097 B2 1/2009 Raby et al.
7,556,496 B2 7/2009 Cinader, Jr. et al.
7,578,673 B2 8/2009 Wen et al.
7,578,674 B2 8/2009 Chishti et al.
7,585,172 B2 9/2009 Rubbert
7,590,462 B2 9/2009 Rubbert
7,604,181 B2 10/2009 Culp et al.
7,621,743 B2 11/2009 Bathen
7,641,473 B2 1/2010 Sporbert
7,674,110 B2 3/2010 Oda
7,677,887 B2 3/2010 Nicholson
7,699,606 B2 4/2010 Sachdeva et al.
7,704,072 B2 4/2010 Damon
7,717,708 B2 5/2010 Sachdeva
7,722,354 B1 5/2010 Dumas
7,726,470 B2 6/2010 Cinader, Jr. et al.
7,726,968 B2 6/2010 Raby et al.
7,751,925 B2 7/2010 Rubbert
7,762,815 B2 7/2010 Cinader, Jr. et al.
7,811,087 B2 10/2010 Wiechmann
7,837,464 B2 11/2010 Marshall
7,837,466 B2 11/2010 Griffith et al.
7,837,467 B2 11/2010 Butscher
7,845,938 B2 12/2010 Kim et al.
7,850,451 B2 12/2010 Wiechmann
7,871,267 B2 1/2011 Griffith et al.
7,878,806 B2 2/2011 Lemchen
7,909,603 B2 3/2011 Oda
D636,084 S 4/2011 Troester
D636,085 S 4/2011 Troester
7,950,131 B2 5/2011 Hilliard
7,993,133 B2 8/2011 Cinader, Jr. et al.
8,021,146 B2 9/2011 Cinader, Jr. et al.
8,029,275 B2 10/2011 Kesling
8,033,824 B2 10/2011 Oda et al.
8,038,444 B2 10/2011 Kitching et al.
8,047,034 B2 11/2011 Butscher
8,057,226 B2 11/2011 Wiechmann
8,070,487 B2 12/2011 Chishti et al.
8,082,769 B2 12/2011 Butscher et al.
8,092,215 B2 1/2012 Stone-collonge et al.
8,102,538 B2 1/2012 Babayoff
8,113,828 B1 2/2012 Greenfield
8,113,829 B2 2/2012 Sachdeva

(56) References Cited

U.S. PATENT DOCUMENTS 8,114,327 B2 2/2012 Cinader, Jr. et al.
8,121,718 B2 2/2012 Rubbert et al.
8,142,187 B2 3/2012 Sporbert
8,152,519 B1 4/2012 Dumas et al.
8,177,551 B2 5/2012 Sachdeva et al.
8,192,196 B2 6/2012 Singh
8,192,197 B2 6/2012 Sporbert
8,194,067 B2 6/2012 Raby
8,220,195 B2 7/2012 Maijer et al.
8,251,699 B2 8/2012 Reising et al.
8,266,940 B2 9/2012 Riemeir et al.
8,297,970 B2 10/2012 Kanomi
8,308,478 B2 11/2012 Primus et al.
8,313,327 B1 11/2012 Won
8,359,115 B2 1/2013 Kopelman et al.
8,363,228 B2 1/2013 Babayoff
8,366,440 B2 2/2013 Bathen
8,376,739 B2 2/2013 Dupray
8,382,917 B2 2/2013 Johnson
8,393,896 B2 3/2013 Oda
8,417,366 B2 4/2013 Getto et al.
8,439,671 B2 5/2013 Cinader, Jr.
8,439,672 B2 5/2013 Matov et al.
8,451,456 B2 5/2013 Babayoff
8,454,364 B2 6/2013 Taub et al.
8,459,988 B2 6/2013 Dumas
8,465,279 B2 6/2013 Bathen
8,469,704 B2 6/2013 Oda et al.
8,479,393 B2 7/2013 Abels et al.
8,485,816 B2 7/2013 Macchi
8,491,306 B2 7/2013 Raby et al.
D688,803 S 8/2013 Gilbert
8,500,445 B2 8/2013 Borri
8,517,727 B2 8/2013 Raby et al.
8,545,221 B2 10/2013 Sonte-collenge et al.
8,550,814 B1 10/2013 Collins
8,562,337 B2 10/2013 Kuo et al.
8,573,972 B2 11/2013 Matov et al.
8,591,225 B2 11/2013 Wu et al.
8,591,226 B2 11/2013 Griffith et al.
8,636,505 B2 1/2014 Fornoff
8,638,447 B2 1/2014 Babayoff et al.
8,638,448 B2 1/2014 Babayoff et al.
8,675,207 B2 3/2014 Babayoff
8,678,818 B2 3/2014 Dupray
8,690,568 B2 4/2014 Chapouland
8,708,697 B2 4/2014 Li et al.
8,714,972 B2 5/2014 Eichenberg
8,734,149 B2 5/2014 Phan et al.
8,734,690 B2 5/2014 Komori
8,780,106 B2 7/2014 Chishti et al.
8,805,048 B2 8/2014 Batesole
8,805,563 B2 8/2014 Kopelman et al.
8,807,995 B2 8/2014 Kabbani et al.
8,807,996 B2 8/2014 Benvegnu' et al.
8,827,697 B2 9/2014 Cinader, Jr. et al.
8,845,330 B2 9/2014 Taub et al.
8,871,132 B2 10/2014 Abels et al.
8,931,171 B2 1/2015 Rosenberg
8,932,054 B1 1/2015 Rosenberg
8,936,464 B2 1/2015 Kopelman
8,961,172 B2 2/2015 Dupray
8,968,365 B2 3/2015 Aschmann et al.
8,979,528 B2 3/2015 Macchi et al.
8,986,004 B2 3/2015 Dumas
8,992,215 B2 3/2015 Chapouland
8,998,608 B2 4/2015 Imgrund et al.
9,022,781 B2 5/2015 Kuo et al.
D731,659 S 6/2015 Singh
9,066,775 B2 6/2015 Bukhary
9,089,386 B2 7/2015 Hagelganz
D736,945 S 8/2015 Singh
9,101,433 B2 8/2015 Babayoff
9,119,689 B2 9/2015 Kabbani
9,127,338 B2 9/2015 Johnson
9,144,473 B2 9/2015 Aldo
9,161,823 B2 10/2015 Morton et al.
9,204,942 B2 12/2015 Phan et al.
9,299,192 B2 3/2016 Kopelman
9,301,815 B2 4/2016 Dumas
9,329,675 B2 5/2016 Ojelund et al.
9,339,352 B2 5/2016 Cinader et al.
9,387,055 B2 7/2016 Cinader, Jr. et al.
9,402,695 B2 8/2016 Curiel et al.
9,427,291 B2 8/2016 Khoshnevis et al.
9,427,916 B2 8/2016 Taub et al.
9,433,477 B2 9/2016 Borovinskih et al.
9,439,737 B2 9/2016 Gonzales et al.
9,451,873 B1 9/2016 Kopelman et al.
9,492,246 B2 11/2016 Lin
9,498,302 B1 11/2016 Patel
D774,193 S 12/2016 Makmel et al.
9,510,757 B2 12/2016 Kopelman et al.
9,517,112 B2 12/2016 Hagelganz et al.
9,529,970 B2 12/2016 Andreiko
9,532,854 B2 * 1/2017 Cinader, Jr. ............ A61C 7/30
9,539,064 B2 1/2017 Abels et al.
9,554,875 B2 1/2017 Gualano
9,566,132 B2 2/2017 Stone-collonge et al.
9,566,134 B2 2/2017 Hagelganz et al.
9,585,733 B2 3/2017 Voudouris
9,585,734 B2 3/2017 Lai et al.
9,597,165 B2 3/2017 Kopelman
9,610,628 B2 4/2017 Riemeier
9,615,901 B2 4/2017 Babyoff et al.
9,622,834 B2 4/2017 Chapouland
9,622,835 B2 4/2017 See et al.
9,629,551 B2 4/2017 Fisker et al.
9,629,694 B2 4/2017 Chun et al.
9,642,678 B2 5/2017 Kuo
9,675,435 B2 6/2017 Karazivan et al.
9,707,056 B2 7/2017 Machata et al.
9,763,750 B2 9/2017 Kim et al.
9,788,917 B2 10/2017 Mah
9,814,543 B2 11/2017 Huang et al.
9,844,420 B2 12/2017 Cheang
9,848,958 B2 12/2017 Matov et al.
9,867,678 B2 1/2018 Macchi
9,867,680 B2 1/2018 Damon
9,872,741 B2 1/2018 Gualano
9,877,804 B2 1/2018 Chester
9,877,805 B2 1/2018 Abels et al.
9,925,020 B2 3/2018 Jo
9,937,018 B2 4/2018 Martz et al.
9,937,020 B2 4/2018 Choi
9,956,058 B2 5/2018 Kopelman
9,962,244 B2 5/2018 Esbech et al.
9,975,294 B2 5/2018 Taub et al.
9,987,105 B2 6/2018 Dupray
10,028,804 B2 7/2018 Schulhof et al.
10,045,834 B2 8/2018 Gualano
10,052,177 B2 8/2018 Andreiko
10,058,400 B2 8/2018 Abels et al.
10,058,401 B2 8/2018 Tan
10,064,706 B2 9/2018 Dickerson
10,070,943 B2 9/2018 Fornoff
10,076,780 B2 9/2018 Riemeier et al.
10,098,709 B1 10/2018 Kitching et al.
10,130,987 B2 11/2018 Riemeier et al.
10,136,966 B2 11/2018 Reybrouck et al.
10,149,738 B2 12/2018 Lee
10,179,035 B2 1/2019 Shivapuja et al.
10,179,036 B2 1/2019 Lee
10,219,877 B2 3/2019 Khoshnevis et al.
10,226,312 B2 3/2019 Khoshnevis et al.
10,238,476 B2 3/2019 Karazivan et al.
10,241,499 B1 3/2019 Griffin
10,278,791 B2 5/2019 Schumacher
10,278,792 B2 5/2019 Wool
10,278,793 B2 5/2019 Gonzalez et al.
10,292,789 B2 5/2019 Martz et al.
10,307,221 B2 6/2019 Cinader, Jr.
10,314,673 B2 6/2019 Schulhof et al.
10,327,867 B2 6/2019 Nikolskiy et al.

(56) References Cited

U.S. PATENT DOCUMENTS

| | | | |
|---|---|---|---|
| 10,342,640 | B2 | 7/2019 | Cassalia |
| 10,368,961 | B2 | 8/2019 | Paehl et al. |
| 10,383,707 | B2 | 8/2019 | Roein Peikar et al. |
| D859,663 | S | 9/2019 | Cetta et al. |
| 10,413,386 | B2 | 9/2019 | Moon et al. |
| 10,426,575 | B1 | 10/2019 | Raslambekov |
| 10,456,228 | B2 | 10/2019 | Karazivan et al. |
| 10,478,271 | B2 | 11/2019 | Patel |
| 10,485,638 | B2 | 11/2019 | Salah |
| 10,492,889 | B2 | 12/2019 | Kim et al. |
| 10,492,890 | B2 | 12/2019 | Cinader, Jr. et al. |
| 10,555,792 | B2 | 2/2020 | Kopelman et al. |
| 10,588,717 | B2 | 3/2020 | Chun et al. |
| 10,595,966 | B2 | 3/2020 | Carrier, Jr. et al. |
| 10,596,717 | B2 | 3/2020 | Hashish et al. |
| 10,603,137 | B2 | 3/2020 | Alauddin et al. |
| 10,636,522 | B2 | 4/2020 | Katzman et al. |
| 10,639,130 | B2 | 5/2020 | Blees et al. |
| 10,639,134 | B2 | 5/2020 | Shangjani et al. |
| 10,717,208 | B1 | 7/2020 | Raslambekov et al. |
| 10,754,325 | B1 | 8/2020 | Griffin, III |
| 10,758,323 | B2 | 9/2020 | Kopelman |
| 10,772,706 | B2 | 9/2020 | Schumacher |
| 10,806,376 | B2 | 10/2020 | Lotan et al. |
| 10,809,697 | B2 | 10/2020 | Grapsas |
| 10,820,966 | B2 | 11/2020 | Kim et al. |
| 10,828,133 | B2 | 11/2020 | Tong et al. |
| 10,849,723 | B1 | 12/2020 | Yancey et al. |
| 10,869,738 | B2 | 12/2020 | Witte et al. |
| 10,881,488 | B2 | 1/2021 | Kopelman |
| 10,881,489 | B2 | 1/2021 | Tong et al. |
| 10,905,527 | B2 | 2/2021 | Roein Peikar et al. |
| 10,932,887 | B2 | 3/2021 | Hung |
| 10,935,958 | B2 | 3/2021 | Sirovskiy et al. |
| 10,952,820 | B2 | 3/2021 | Song et al. |
| 10,980,614 | B2 | 4/2021 | Roein Peikar et al. |
| 10,984,549 | B2 | 4/2021 | Goncharov et al. |
| 10,993,782 | B1 | 5/2021 | Raslambekov |
| 10,993,785 | B2 | 5/2021 | Roein Peikar et al. |
| 10,996,813 | B2 | 5/2021 | Makarenkova et al. |
| 11,020,205 | B2 | 6/2021 | Li et al. |
| 11,045,281 | B2 | 6/2021 | Tsai et al. |
| 11,045,295 | B2 | 6/2021 | Karazivan et al. |
| 11,058,517 | B2 | 7/2021 | Tong et al. |
| 11,058,518 | B2 | 7/2021 | Roein Peikar et al. |
| 11,058,520 | B2 | 7/2021 | Khoshnevis et al. |
| 11,072,021 | B2 | 7/2021 | Riemeier et al. |
| 11,083,411 | B2 | 8/2021 | Yancey et al. |
| 11,083,546 | B2 | 8/2021 | Cassalia |
| 11,103,330 | B2 | 8/2021 | Webber et al. |
| 11,129,696 | B2 | 9/2021 | Khoshnevis et al. |
| 11,147,652 | B2 | 10/2021 | Mason et al. |
| 11,154,382 | B2 | 10/2021 | Kopelman et al. |
| 11,229,505 | B2 | 1/2022 | Schumacher et al. |
| 11,234,794 | B2 | 2/2022 | Pokotilov et al. |
| 11,259,899 | B2 | 3/2022 | Hoss et al. |
| 11,304,781 | B2 | 4/2022 | Chun et al. |
| 11,317,994 | B2 | 5/2022 | Peikar et al. |
| 11,317,995 | B2 | 5/2022 | Peikar et al. |
| 11,324,572 | B2 | 5/2022 | Peikar et al. |
| 11,331,165 | B2 | 5/2022 | Owen |
| 11,337,486 | B2 | 5/2022 | Oda et al. |
| 11,357,598 | B2 | 6/2022 | Cramer |
| 11,382,720 | B2 | 7/2022 | Kopelman et al. |
| 11,413,117 | B2 | 8/2022 | Griffin, III et al. |
| 11,419,701 | B2 | 8/2022 | Shanjani et al. |
| 11,433,658 | B2 | 9/2022 | Friedrich et al. |
| 11,435,142 | B2 | 9/2022 | Hauptmann |
| 11,446,117 | B2 | 9/2022 | Paehl et al. |
| 11,446,219 | B2 | 9/2022 | Kohler et al. |
| 11,464,604 | B2 | 10/2022 | Makarenkova et al. |
| 11,471,254 | B2 | 10/2022 | Owen |
| 11,471,255 | B2 | 10/2022 | Cinader, Jr. et al. |
| 11,478,335 | B2 | 10/2022 | Lai et al. |
| 11,478,337 | B2 | 10/2022 | Griffin, III et al. |

| | | | |
|---|---|---|---|
| 11,490,995 | B2 | 11/2022 | Wratten, Jr. et al. |
| 11,500,354 | B2 | 11/2022 | Griffin, III et al. |
| 11,504,212 | B2 | 11/2022 | Wratten, Jr. et al. |
| 11,510,757 | B2 | 11/2022 | Khoshnevis et al. |
| 11,510,758 | B2 | 11/2022 | Khoshnevis et al. |
| D972,732 | S | 12/2022 | Villanueva |
| 11,517,405 | B2 | 12/2022 | Khoshnevis et al. |
| 11,612,458 | B1 | 3/2023 | Tong et al. |
| 11,612,459 | B2 | 3/2023 | Tong et al. |
| 11,696,816 | B2 | 7/2023 | Gardner |
| 11,911,971 | B2 | 2/2024 | Tong et al. |
| 11,957,536 | B2 | 4/2024 | Tong et al. |
| 12,042,354 | B2 | 7/2024 | Tong et al. |
| 12,053,345 | B2 | 8/2024 | Tong et al. |
| 12,053,346 | B2 | 8/2024 | Suh et al. |
| D1,043,994 | S | 9/2024 | Oda et al. |
| 12,090,025 | B2 | 9/2024 | Oda et al. |
| 12,193,908 | B2 | 1/2025 | Oda et al. |
| 12,207,987 | B2 | 1/2025 | Tong et al. |
| 12,220,294 | B2 | 2/2025 | Tong et al. |
| 12,268,571 | B2 | 4/2025 | Oda |
| 12,279,925 | B2 | 4/2025 | Khoshnevis et al. |
| 12,370,021 | B2 | 7/2025 | Tong et al. |
| D1,107,922 | S | 12/2025 | Oda et al. |
| 12,521,208 | B2 | 1/2026 | Tong et al. |
| 12,588,980 | B2 | 3/2026 | Khoshnevis et al. |
| 2001/0055741 | A1 | 12/2001 | Dixon et al. |
| 2002/0006597 | A1 | 1/2002 | Andreiko et al. |
| 2002/0010568 | A1 | 1/2002 | Rubbert et al. |
| 2002/0081546 | A1 | 6/2002 | Tricca et al. |
| 2002/0098460 | A1 | 7/2002 | Farzin-Nia |
| 2002/0192617 | A1 | 12/2002 | Phan et al. |
| 2003/0049582 | A1 | 3/2003 | Abels et al. |
| 2003/0070468 | A1 | 4/2003 | Butscher et al. |
| 2003/0073052 | A1 | 4/2003 | Yamamoto |
| 2003/0180689 | A1 | 9/2003 | Arx et al. |
| 2003/0194677 | A1 | 10/2003 | Sachdeva et al. |
| 2003/0207224 | A1 | 11/2003 | Lotte |
| 2004/0048222 | A1 | 3/2004 | Forster et al. |
| 2004/0072120 | A1 | 4/2004 | Lauren |
| 2004/0083611 | A1 | 5/2004 | Rubbert et al. |
| 2004/0161722 | A1 | 8/2004 | Lai et al. |
| 2004/0166459 | A1 | 8/2004 | Voudouris |
| 2004/0168752 | A1 | 9/2004 | Julien |
| 2004/0199177 | A1 | 10/2004 | Kim |
| 2004/0219471 | A1 | 11/2004 | Cleary et al. |
| 2005/0043837 | A1 | 2/2005 | Rubbert et al. |
| 2005/0064359 | A1 | 3/2005 | Nikodem |
| 2005/0074716 | A1 | 4/2005 | Cleary et al. |
| 2005/0106529 | A1 | 5/2005 | Abolfathi et al. |
| 2005/0181332 | A1 | 8/2005 | Sernetz |
| 2005/0191592 | A1 | 9/2005 | Farzin-Nia et al. |
| 2005/0233276 | A1 | 10/2005 | Kopelman et al. |
| 2005/0244780 | A1 | 11/2005 | Abels et al. |
| 2005/0244781 | A1 | 11/2005 | Abels et al. |
| 2005/0244790 | A1 | 11/2005 | Kuperman |
| 2006/0006092 | A1 | 1/2006 | DuBos |
| 2006/0014116 | A1 | 1/2006 | Maijer et al. |
| 2006/0068354 | A1 | 3/2006 | Jeckel |
| 2006/0127834 | A1 | 6/2006 | Szwajkowski et al. |
| 2006/0175209 | A1 | 8/2006 | Sabilla et al. |
| 2006/0223021 | A1 | 10/2006 | Cinader et al. |
| 2006/0223031 | A1 | 10/2006 | Cinader et al. |
| 2006/0257813 | A1 | 11/2006 | Highland |
| 2006/0257821 | A1 | 11/2006 | Cinader et al. |
| 2007/0015103 | A1 | 1/2007 | Sorel |
| 2007/0031773 | A1 | 2/2007 | Scuzzo |
| 2007/0031775 | A1 | 2/2007 | Andreiko |
| 2007/0087302 | A1 | 4/2007 | Reising et al. |
| 2007/0107745 | A1 | 5/2007 | Kiyomoto |
| 2007/0111154 | A1 | 5/2007 | Sampermans |
| 2007/0118215 | A1 | 5/2007 | Moaddeb |
| 2007/0134611 | A1 | 6/2007 | Nicholson |
| 2007/0134612 | A1 | 6/2007 | Contencin |
| 2007/0141525 | A1 | 6/2007 | Cinader, Jr. |
| 2007/0154859 | A1 | 7/2007 | Hilliard |
| 2007/0172788 | A1 | 7/2007 | Hill, II et al. |
| 2007/0190478 | A1 | 8/2007 | Goldberg et al. |
| 2007/0231768 | A1 | 10/2007 | Hutchinson |

(56) References Cited

U.S. PATENT DOCUMENTS

2007/0235051 A1 10/2007 Robinson
2007/0287121 A1 12/2007 Cinader et al.
2008/0032250 A1 2/2008 Kopelman et al.
2008/0057460 A1 3/2008 Hicks
2008/0063995 A1 3/2008 Farzin-Nia et al.
2008/0131831 A1 6/2008 Abels et al.
2008/0160475 A1 7/2008 Rojas-Pardini
2008/0199825 A1 8/2008 Jahn
2008/0227049 A1 9/2008 Sevinc
2008/0233528 A1 9/2008 Kim et al.
2008/0233530 A1 9/2008 Cinader
2008/0233531 A1 9/2008 Raby et al.
2008/0248439 A1 10/2008 Griffith et al.
2008/0254403 A1 10/2008 Hilliard
2008/0268398 A1 10/2008 Cantarella
2008/0286711 A1 11/2008 Corcoran et al.
2008/0305450 A1 12/2008 Steen
2009/0004619 A1 1/2009 Oda et al.
2009/0017410 A1 1/2009 Raby et al.
2009/0019698 A1 1/2009 Christoff
2009/0042160 A1 2/2009 Ofir
2009/0088838 A1 4/2009 Shaolian et al.
2009/0136889 A1 5/2009 Abels et al.
2009/0191502 A1 7/2009 Cao et al.
2009/0197217 A1 8/2009 Butscher et al.
2009/0216322 A1 8/2009 Le et al.
2009/0220907 A1 9/2009 Suyama
2009/0220920 A1 9/2009 Primus et al.
2009/0222075 A1 9/2009 Gordon
2010/0092903 A1 4/2010 Sabilla
2010/0092905 A1 4/2010 Martin
2010/0105000 A1 4/2010 Scommegna et al.
2010/0129765 A1 5/2010 Mohr et al.
2010/0129766 A1 5/2010 Hilgers
2010/0151403 A1 6/2010 Tuneberg
2010/0178628 A1 7/2010 Kim
2010/0179789 A1 7/2010 Sachdeva et al.
2010/0193979 A1 8/2010 Goldberg et al.
2010/0241120 A1 9/2010 Bledsoe et al.
2010/0279243 A1 11/2010 Cinader, Jr. et al.
2010/0285421 A1 11/2010 Heiser
2010/0304321 A1 12/2010 Patel
2011/0008745 A1 1/2011 McQuillan et al.
2011/0027743 A1 2/2011 Cinader, Jr. et al.
2011/0033814 A1 2/2011 Wool
2011/0059414 A1 3/2011 Hirsch
2011/0091832 A1 4/2011 Kim et al.
2011/0111358 A1 5/2011 Griffith et al.
2011/0220612 A1 9/2011 Kim
2011/0250556 A1 10/2011 Heiser
2011/0270583 A1 11/2011 Getto et al.
2011/0287376 A1 11/2011 Walther
2011/0314891 A1 12/2011 Gilbert
2012/0048432 A1 3/2012 Johnson et al.
2012/0129119 A1 5/2012 Oda
2012/0148972 A1 6/2012 Lewis
2012/0208144 A1 8/2012 Chiaramonte
2012/0266419 A1 10/2012 Browne et al.
2012/0315595 A1 12/2012 Beaudoin
2012/0322019 A1 12/2012 Lewis
2013/0040260 A1 2/2013 Bukhary
2013/0065193 A1 3/2013 Curiel et al.
2013/0122443 A1 5/2013 Huang et al.
2013/0177862 A1 7/2013 Johnson
2013/0189640 A1 7/2013 Kook et al.
2013/0196281 A1 8/2013 Thornton
2013/0196282 A1 8/2013 Eichelberger et al.
2013/0260329 A1 10/2013 Voudouris
2013/0315595 A1 11/2013 Barr
2014/0120491 A1 5/2014 Khoshnevis et al.
2014/0154637 A1 6/2014 Hansen et al.
2014/0170586 A1 6/2014 Cantarella
2014/0212828 A1 7/2014 Falcone et al.
2014/0234794 A1 8/2014 Vu
2014/0255864 A1 9/2014 Machata et al.
2014/0287376 A1 9/2014 Hultgren et al.
2014/0302448 A1 10/2014 Cassalia
2014/0363782 A1 12/2014 Wiechmann et al.
2014/0370454 A1 12/2014 Rudman
2015/0010879 A1 1/2015 Kurthy
2015/0064641 A1 3/2015 Gardner
2015/0072299 A1 3/2015 Alauddin et al.
2015/0140501 A1 5/2015 Kim
2015/0201943 A1 7/2015 Brooks et al.
2015/0250560 A1 9/2015 Gautam
2015/0265376 A1 9/2015 Kopelman
2015/0305833 A1 10/2015 Cosse
2015/0313687 A1 11/2015 Blees et al.
2015/0351872 A1 12/2015 Jo
2015/0359610 A1 12/2015 Gonzalez et al.
2015/0366638 A1 12/2015 Kopelman et al.
2016/0074139 A1 3/2016 Machata et al.
2016/0095670 A1 4/2016 Witte et al.
2016/0106522 A1 4/2016 Kim
2016/0135926 A1 5/2016 Djamchidi
2016/0166357 A1 6/2016 Portalupi
2016/0175073 A1 6/2016 Huang
2016/0206403 A1 7/2016 Ouellette et al.
2016/0228214 A1 8/2016 Sachdeva et al.
2016/0242871 A1 8/2016 Morton et al.
2016/0256242 A1 9/2016 Cinader, Jr. et al.
2016/0270885 A1 9/2016 Kwon et al.
2016/0278883 A1 9/2016 Fasci et al.
2016/0287354 A1 10/2016 Viecilli et al.
2016/0310239 A1 10/2016 Paehl et al.
2016/0361141 A1 12/2016 Tong et al.
2016/0361142 A1 12/2016 Tong et al.
2016/0374780 A1 12/2016 Carrillo Gonzalez et al.
2017/0086948 A1 3/2017 Von Mandach
2017/0105816 A1 4/2017 Ward
2017/0105817 A1 4/2017 Chun et al.
2017/0128169 A1 5/2017 Lai et al.
2017/0135793 A1 5/2017 Webber et al.
2017/0140381 A1 5/2017 Ducrohet et al.
2017/0151037 A1 6/2017 Lee
2017/0156823 A1* 6/2017 Roein Peikar ........... A61C 7/28
2017/0165032 A1 6/2017 Webber et al.
2017/0165532 A1 6/2017 Khan et al.
2017/0181813 A1 6/2017 Kalkhoran
2017/0196660 A1 7/2017 Lee
2017/0224444 A1 8/2017 Viecilli et al.
2017/0231721 A1 8/2017 Akeel et al.
2017/0246682 A1 8/2017 Duerig
2017/0252140 A1 9/2017 Murphy et al.
2017/0281313 A1 10/2017 Kim
2017/0281314 A1 10/2017 Freimuller
2017/0296253 A1 10/2017 Brandner et al.
2017/0296304 A1 10/2017 Tong et al.
2017/0312052 A1 11/2017 Moss et al.
2017/0318881 A1 11/2017 Fonte et al.
2017/0325911 A1 11/2017 Marshall
2017/0340777 A1 11/2017 Ma et al.
2018/0014915 A1 1/2018 Voudouris
2018/0014916 A1 1/2018 Cinader, Jr. et al.
2018/0021108 A1 1/2018 Cinader, Jr. et al.
2018/0049847 A1* 2/2018 Oda ......................... A61C 7/30
2018/0055605 A1 3/2018 Witte et al.
2018/0071057 A1 3/2018 Rudman
2018/0110589 A1 4/2018 Gao
2018/0132974 A1 5/2018 Rudman
2018/0161121 A1 6/2018 Butler et al.
2018/0161126 A1 6/2018 Marshall et al.
2018/0168788 A1 6/2018 Fernie
2018/0185120 A1 7/2018 Wool
2018/0185121 A1 7/2018 Pitts et al.
2018/0206941 A1 7/2018 Lee
2018/0214250 A1 8/2018 Martz
2018/0235437 A1 8/2018 Ozerov et al.
2018/0243052 A1 8/2018 Lee
2018/0318047 A1 11/2018 Kesling
2018/0338564 A1 11/2018 Oda et al.
2019/0001396 A1 1/2019 Riemeier et al.
2019/0019187 A1 1/2019 Miller et al.
2019/0053876 A1 2/2019 Sterental et al.

(56) References Cited

U.S. PATENT DOCUMENTS

2019/0090988 A1 3/2019 Schumacher et al.
2019/0090989 A1 3/2019 Jo
2019/0125494 A1 5/2019 Li et al.
2019/0142551 A1 5/2019 Dickenson et al.
2019/0159871 A1 5/2019 Chan et al.
2019/0163060 A1 5/2019 Skamser et al.
2019/0175304 A1 6/2019 Morton et al.
2019/0231488 A1 8/2019 Dickerson
2019/0247147 A1 8/2019 Grande et al.
2019/0252065 A1 8/2019 Katzman et al.
2019/0262103 A1 8/2019 Cassalia
2019/0276921 A1 9/2019 Duerig et al.
2019/0321136 A1 10/2019 Martz et al.
2019/0321138 A1 10/2019 Roein Peikar et al.
2019/0328487 A1 10/2019 Levin et al.
2019/0328491 A1 10/2019 Hostettler et al.
2019/0343606 A1 11/2019 Wu et al.
2019/0350682 A1 11/2019 Cinader, Jr. et al.
2019/0388189 A1 12/2019 Shivapuja et al.
2020/0000551 A1 1/2020 Li et al.
2020/0066391 A1 2/2020 Sachdeva et al.
2020/0078137 A1 3/2020 Chen et al.
2020/0107911 A1 4/2020 Roein Peikar et al.
2020/0129272 A1 4/2020 Roein Peikar et al.
2020/0138549 A1 5/2020 Chun et al.
2020/0146779 A1 5/2020 Zhang
2020/0146791 A1 5/2020 Schülke et al.
2020/0170757 A1 6/2020 Kopelman et al.
2020/0188063 A1 6/2020 Cinader, Jr. et al.
2020/0197131 A1 6/2020 Matov et al.
2020/0214806 A1 7/2020 Hung
2020/0229903 A1 7/2020 Sandwick
2020/0275996 A1 9/2020 Tong et al.
2020/0281611 A1 9/2020 Kelly et al.
2020/0338706 A1 10/2020 Cunningham et al.
2020/0345455 A1 11/2020 Roein Peikar et al.
2020/0345459 A1 11/2020 Schueller et al.
2020/0345460 A1 11/2020 Roein Peikar et al.
2020/0352686 A1 11/2020 Yancey et al.
2020/0352765 A1 11/2020 Lin
2020/0360109 A1 11/2020 Gao et al.
2020/0375270 A1 12/2020 Holschuh et al.
2020/0375699 A1 12/2020 Roein Peikar et al.
2020/0390524 A1* 12/2020 Roein Peikar ........... A61C 7/22
2020/0390535 A1 12/2020 Curtis et al.
2020/0405191 A1 12/2020 Lotan et al.
2020/0405452 A1 12/2020 Song et al.
2021/0007830 A1 1/2021 Roein Peikar et al.
2021/0007832 A1 1/2021 Roein Peikar et al.
2021/0045701 A1 2/2021 Unklesbay et al.
2021/0068928 A1 3/2021 Witte et al.
2021/0077227 A1 3/2021 Griffin, III et al.
2021/0093422 A1 4/2021 Tong et al.
2021/0128275 A1 5/2021 Suh et al.
2021/0134450 A1 5/2021 Katzman et al.
2021/0137644 A1 5/2021 Benarouch et al.
2021/0145547 A1 5/2021 Roein Peikar et al.
2021/0177551 A1 6/2021 Roein Peikar et al.
2021/0186662 A1 6/2021 Roein Peikar et al.
2021/0205049 A1 7/2021 Cinader, Jr.
2021/0212803 A1* 7/2021 Tong ........................ A61C 7/28
2021/0244502 A1 8/2021 Farkash et al.
2021/0244505 A1 8/2021 Tong et al.
2021/0244507 A1 8/2021 Curiel et al.
2021/0251730 A1 8/2021 Curiel et al.
2021/0259808 A1 8/2021 Ben-Gal Nguyen et al.
2021/0275286 A1 9/2021 Karazivan et al.
2021/0330430 A1 10/2021 Khoshnevis et al.
2021/0338380 A1 11/2021 Park et al.
2021/0346127 A1 11/2021 Cassalia
2021/0353389 A1 11/2021 Peikar et al.
2021/0369413 A1 12/2021 Li et al.
2021/0378792 A1 12/2021 Akopov et al.
2021/0386523 A1 12/2021 Raby, II et al.
2021/0393375 A1 12/2021 Chekh et al.
2021/0401546 A1 12/2021 Gardner
2021/0401548 A1* 12/2021 Oda ......................... A61C 7/02
2022/0008169 A1 1/2022 Reisman
2022/0023009 A1 1/2022 Tong et al.
2022/0031428 A1 2/2022 Khoshnevis et al.
2022/0039921 A1 2/2022 Kopelman et al.
2022/0039922 A1 2/2022 Yamaguchi
2022/0061964 A1 3/2022 Khoshnevis et al.
2022/0087783 A1 3/2022 Khoshnevis et al.
2022/0133438 A1 5/2022 Wratten, Jr. et al.
2022/0137592 A1 5/2022 Cramer et al.
2022/0168072 A1 6/2022 Tong et al.
2022/0183797 A1 6/2022 Khoshnevis et al.
2022/0226076 A1 7/2022 Roein Peikar et al.
2022/0226077 A1 7/2022 Roein Peikar et al.
2022/0249201 A1 8/2022 Shuman et al.
2022/0257341 A1 8/2022 Somasundaram et al.
2022/0257344 A1 8/2022 Tsai et al.
2022/0287804 A1 9/2022 Oda
2022/0304773 A1 9/2022 Wratten, Jr. et al.
2022/0304774 A1 9/2022 Wratten, Jr. et al.
2022/0314508 A1 10/2022 Subramaniam et al.
2022/0323183 A1 10/2022 Dufour et al.
2022/0338960 A1 10/2022 Reising
2022/0346912 A1 11/2022 Li et al.
2022/0361996 A1 11/2022 Raby et al.
2023/0012364 A1 1/2023 Melka et al.
2023/0070165 A1 3/2023 Tong et al.
2023/0070837 A1 3/2023 Oda
2023/0072074 A1 3/2023 Oda
2023/0100466 A1 3/2023 Huynh et al.
2023/0146008 A1 5/2023 Anthony
2023/0157790 A1 5/2023 Medvinskaya et al.
2023/0404715 A1 12/2023 Peikar et al.
2023/0414327 A1 12/2023 Peikar et al.
2024/0008959 A1 1/2024 Paehl et al.
2024/0058101 A1 2/2024 Tong et al.
2024/0061966 A1 2/2024 Oda et al.
2024/0074836 A1 3/2024 Roein Peikar et al.
2024/0090980 A1* 3/2024 Tong ........................ A61C 7/08
2024/0138958 A1 5/2024 Oda et al.
2024/0173105 A1 5/2024 Tong et al.
2024/0277452 A1 8/2024 Tong et al.
2024/0358478 A1 10/2024 Tong et al.
2024/0398513 A1 12/2024 Oda et al.
2024/0423761 A1 12/2024 Suh et al.
2025/0099292 A1 3/2025 Veis
2026/0033921 A1 2/2026 Tong et al.

FOREIGN PATENT DOCUMENTS

CN 201320224 Y 10/2009
CN 102152017 8/2011
CN 102215773 10/2011
CN 202365955 8/2012
CN 202892116 4/2013
CN 203074896 7/2013
CN 103505293 1/2014
CN 203506900 4/2014
CN 104188728 12/2014
CN 204049881 12/2014
CN 205126459 4/2016
CN 105596098 5/2016
CN 105662615 6/2016
CN 205416056 8/2016
CN 205569100 9/2016
CN 106029002 10/2016
CN 106137419 11/2016
CN 105520787 12/2017
CN 108690967 10/2018
CN 109009504 12/2018
CN 110916820 2/2020
CN 110840586 2/2022
CN 114167807 3/2022
CN 117695035 3/2024
DE 3915807 11/1990
DE 10 2007 008 356 B3 7/2008
DE 20 2018 003 574 U1 8/2018
DE 10 2018 005 769 A1 1/2020

(56) References Cited

FOREIGN PATENT DOCUMENTS

| | | | |
|---|---|---|---|
| DE | 10 2018 133 705 | A1 | 7/2020 |
| DE | 10 2015 017 301 | | 3/2022 |
| EP | 0 778 008 | | 6/1997 |
| EP | 1 139 902 | | 10/2001 |
| EP | 1 276 433 | | 1/2003 |
| EP | 1 379 193 | | 2/2007 |
| EP | 2 076 207 | | 7/2009 |
| EP | 1 073 378 | | 1/2012 |
| EP | 2 522 298 | | 11/2012 |
| EP | 2 617 383 | | 7/2013 |
| EP | 3 285 678 | | 5/2021 |
| EP | 3 954 320 | | 2/2022 |
| EP | 2 726 049 | | 8/2022 |
| EP | 3 019 141 | | 8/2022 |
| EP | 4 034 077 | | 8/2022 |
| EP | 4 035 649 | | 8/2022 |
| EP | 4 044 959 | | 8/2022 |
| EP | 4 048 196 | | 8/2022 |
| EP | 4065647 | A1 | 8/2022 |
| EP | 3 691 559 | | 9/2022 |
| EP | 3 823 813 | | 9/2022 |
| EP | 3 905 986 | | 9/2022 |
| EP | 4 056 144 | | 9/2022 |
| ES | 2 315 046 | | 4/2010 |
| FR | 2 525 469 | | 10/1983 |
| FR | 3 056 393 | | 10/2018 |
| JP | 11221235 | A | 8/1999 |
| JP | 2001198143 | A | 7/2001 |
| JP | 2009205330 | A | 9/2009 |
| JP | 1477882 | | 8/2013 |
| JP | 1477883 | | 8/2013 |
| JP | 2018507750 | A | 3/2018 |
| JP | 2018536527 | A | 12/2018 |
| KR | 100549294 | | 2/2006 |
| KR | 100737442 | | 7/2007 |
| KR | 100925286 | | 11/2009 |
| KR | 101301886 | | 8/2013 |
| KR | 101583547 | | 1/2016 |
| KR | 101584737 | | 1/2016 |
| KR | 101723674 | | 4/2017 |
| RU | 133408 | U1 | 10/2013 |
| TW | 110302541 | | 12/2021 |
| WO | WO 01/80761 | | 11/2001 |
| WO | WO 01/85047 | | 11/2001 |
| WO | WO 2003/045266 | | 6/2003 |
| WO | WO 2005/008441 | | 1/2005 |
| WO | WO 2005/094716 | | 10/2005 |
| WO | WO 2007/069286 | | 6/2007 |
| WO | WO 2008/051774 | | 5/2008 |
| WO | WO 2011/034522 | | 3/2011 |
| WO | WO 2011/090502 | | 7/2011 |
| WO | WO 2011/103669 | | 9/2011 |
| WO | WO 2012/089735 | | 7/2012 |
| WO | WO 2012/140021 | | 10/2012 |
| WO | WO 2013/019398 | | 2/2013 |
| WO | WO 2014/070920 | | 5/2014 |
| WO | WO 2016/148961 | | 9/2016 |
| WO | WO 2016/149007 | | 9/2016 |
| WO | WO 2016/149008 | | 9/2016 |
| WO | WO 2016/199972 | | 12/2016 |
| WO | WO 2016/210402 | | 12/2016 |
| WO | WO 2017/007079 | | 1/2017 |
| WO | WO 2017/100198 | | 6/2017 |
| WO | WO 2017/112004 | | 6/2017 |
| WO | WO 2017/172537 | | 10/2017 |
| WO | WO 2017/184632 | | 10/2017 |
| WO | WO 2017/194478 | | 11/2017 |
| WO | WO 2017/198640 | | 11/2017 |
| WO | WO 2018/102588 | | 6/2018 |
| WO | WO 2018/122862 | | 7/2018 |
| WO | WO 2018/144634 | | 8/2018 |
| WO | WO 2018/195356 | | 10/2018 |
| WO | WO 2019/135504 | | 7/2019 |
| WO | WO 2020/095182 | | 5/2020 |
| WO | WO 2020/178353 | | 9/2020 |
| WO | WO 2020/180740 | | 9/2020 |
| WO | WO 2020/223744 | | 11/2020 |
| WO | WO 2020/223745 | | 11/2020 |
| WO | WO 2021/087158 | | 5/2021 |
| WO | WO 2021/105878 | | 6/2021 |
| WO | WO 2021/130611 | | 7/2021 |
| WO | WO 2021/214613 | | 10/2021 |
| WO | WO 2021/225916 | | 11/2021 |
| WO | WO 2021/226618 | | 11/2021 |
| WO | WO 2021/245484 | | 12/2021 |
| WO | WO 2021/252675 | | 12/2021 |
| WO | WO 2022/099263 | | 5/2022 |
| WO | WO 2022/099267 | | 5/2022 |
| WO | WO 2022/123402 | | 6/2022 |
| WO | WO 2022/137109 | | 6/2022 |
| WO | WO 2022/145602 | | 7/2022 |
| WO | WO 2022/159738 | | 7/2022 |
| WO | WO 2022/162488 | | 8/2022 |
| WO | WO 2022/162528 | | 8/2022 |
| WO | WO 2022/162614 | | 8/2022 |
| WO | WO 2022/167899 | | 8/2022 |
| WO | WO 2022/167995 | | 8/2022 |
| WO | WO 2022/180466 | | 9/2022 |
| WO | WO 2022/189906 | | 9/2022 |
| WO | WO 2022/192409 | | 9/2022 |
| WO | WO 2022/195391 | | 9/2022 |
| WO | WO 2022/204711 | | 9/2022 |
| WO | WO 2022/214895 | | 10/2022 |
| WO | WO 2022/217269 | | 10/2022 |
| WO | WO 2022/219459 | | 10/2022 |
| WO | WO 2022/229734 | | 11/2022 |
| WO | WO 2022/229739 | | 11/2022 |
| WO | WO 2022/236027 | | 11/2022 |
| WO | WO 2022/236287 | | 11/2022 |
| WO | WO 2023/033869 | | 3/2023 |
| WO | WO 2023/033870 | | 3/2023 |
| WO | WO 2023/034876 | | 3/2023 |
| WO | WO 2024/040008 | | 2/2024 |
| WO | WO 2024/059653 | | 3/2024 |

OTHER PUBLICATIONS

ElSheikh, Moaaz Mohamed, et al. "A Forsus Distalizer: A Pilot Typodont Study". Jul.-Dec. 2004, KDJ, vol. 7, No. 2, pp. 107-115.

Gilbert, Alfredo. An in-office wire-bending robot for lingual orthodontics. ResearchGate. Article in Journal of clinical orthodontics: JCO, Apr. 2011.

Glauser-Williams Orthodontics: Appliances, http://www.glauserwilliamsorthodontics.com/treatments/orthodontic-appliances.php , accessed Nov. 30, 2015 in 4 pages.

Invisalign® SmileView™, How Would You Look with Straight Teeth?, https://www.invisalign.com/get-started/invisalign-smileview?v=0#start, printed Jun. 7, 2022 in 2 pages.

IPhone 3D scanning to dental software, screen shots at 0:09 and 7:00 of YouTube video, https://www.youtube.com/watch?v=QONGdQ3QiFE, uploaded Oct. 1, 2018 in 2 pages.

Jiang et al. Bending Process Analysis and Structure Design of Orthodontic Archwire Bending Robot. International Journal of Smart Home. vol. 7, No. 5 (2013), pp. 345-352. http://dx.doi.org/10.14257/ijsh.2013.7.5.33.

Jiang et al. A Review on Robot in Prosthodontics and Orthodontics. Hindawi Publishing Corporation. Advances in Mechanical Engineering. Article ID 198748. 2014. 11 pages.

Mahony, Derek, "How We Got From There to Here and Back". Dental Learning Hub (Capture of web page dated Jun. 24, 2013 downloaded from http://web.archive.org/web/20130624145806/http://www.dental-learninghub.com/Clinical/Orthodontics.aspx, downloaded Feb. 7, 2014).

Miller, R.J. et al. "Validation of Align Technology's Treat III™ Digital Model Superimposition Tool and Its Case Application". Orthodontic Craniofacial Res.,2003, vol. 6 (Suppl 1): pp. 143-149.

A ScanBox demo, https://www.youtube.com/watch?v=MsCfv2PDQ0o, screen shots at 0:08 and 0:19 of YouTube video, uploaded May 5, 2019 in 2 pages.

(56) References Cited

OTHER PUBLICATIONS

SinoDentalGroup, "Braces Bonding Teeth Gems Glue Light Cure Adhesive", https://sinodentalgroup.myshopify.com/products/sino-dental-group-orthodontic-brackets-glue-braces-bonding-light-cure-adhesive-kit?pr_prod_strat=use_description&pr_rec_id=0d0a6cdc9&pr_rec_pid=6687895355572&pr_ref_pid=6705886363828&pr_seq=uniform, downloaded Jun. 7, 2023 in 12 pages.

Southern Maine Orthodontics, Virtual Orthodontic Treatment, https://southernmainebraces.com/virtual-orthodontic-treatment/, printed Jun. 7, 2022 in 3 pages.

Spini et al., "Transition temperature range of thermally activated nickel-titanium archwires", J Appl Oral Sci., Apr. 2014, vol. 22, No. 2, pp. 109-117.

SureSmile. 2013. About SureSmile. (Capture of web page dated Jun. 21, 2013 downloaded from http://web.archive.org/web/20130621031404/http://suresmile.com/About-SureSmile, downloaded Feb. 7, 2014).

Xia, et al. Development of a Robotic System for Orthodontic Archwire Bending. 2016 IEEE International Conference on Robotics and Automation (ICRA). Stockholm, Sweden, May 16-21, 2016. pp. 730-735.

Yang, Won-Sik, et al. "A Study of the Regional Load Deflection Rate of Multiloop Edgewise Arch Wire." Angle Orthodontist, 2001, vol. 7, No. 2, pp. 103-109.

Richard Gawel, Swift Health Systems Raises $45 Million to Finance Invisible Orthodontics, dated as published on: Dec. 4, 2019, dentistrytoday.com, Retrieved from Internet: https://www.dentistrytoday.com/products/swift-health-systems-raises-45-million-to-finance-invisible-orthodontics/ (Dated Year: 2019).

Gowen, InBrace, an Irvine startup with USC ties, puts new kind of braces behind your teeth, retrieved from https://www.ocregister.com/2021/09/20/this-irvine-startup-is-reinventing-braces-putting-the-metal-out-of-sight/, Sep. 20, 2021.

In Brace, Brush & Floss Easily with In Brace, dated as uploaded on: May 26, 2022, YouTube, Retrieved from Internet: https://www.youtube.com/watch?v=uAsxiBlbY4Y (Dated Year: 2022).

In Brace, What Is In Brace?—Integration Booster, dated as uploaded on: May 22, 2023, YouTube, Retrieved from Internet: https://www.youtube.com/watch?v=ANUPkCSfQo4 (Dated Year: 2023).

MEAW School, Introduction to MEAW (Multi-loop Edgewise Arch Wire), dated as uploaded On: Mar. 24, 2021, YouTube, Retrieved from Internet: https://www.youtube.com/watch?v=ne785jIzN Pg (Year: 2021).

Orthopracticeus, Orthodontic Practice Webinar, https://orthopracticeus.com/webinar/how-to-grow-your-practice-with-new-to-orthodontic-consumers/, Jun. 15, 2022.

TamkinSpice, InBrace Lingual Braces, https://www.youtube.com/watch?v=kniHp17KF8l, Jan. 18, 2021.

* cited by examiner

NON-SLIDING ORTHODONTIC ARCHFORMS

CROSS REFERENCE TO RELATED APPLICATIONS

This application claims priority to U.S. Provisional Patent Application No. 63/375,832, filed Sep. 15, 2022, which is incorporated herein by reference in its entirety. Any and all applications, if any, for which a foreign or domestic priority claim is identified in the Application Data Sheet of the present application is hereby incorporated by reference under 37 CFR 1.57.

BACKGROUND

Field

The present disclosure relates in some aspects to non-sliding orthodontic archforms such as non-sliding archforms with interproximal loops.

SUMMARY

Teeth can be moved by bonding orthodontic brackets to the lingual or buccal surfaces of a patient's teeth and coupling an archform to the bonded orthodontic brackets. The archform can exert forces on the brackets using sliding or non-sliding mechanics, which can cause the patient's teeth to move toward a planned alignment. When using non-sliding mechanics, connectors of an archform can be coupled to the bonded orthodontic brackets such that the connectors do not slide relative to the orthodontic brackets. The archform can include interproximal segments disposed between adjacent connectors that have loops. The loops can be configured, by way of custom shape setting, to exert forces on the adjacent connectors to move the adjacent teeth toward the planned alignment. In some instances, adjacent teeth may need to be moved a relatively larger distance (e.g., closer together or farther apart). For example, a patient may be missing a tooth such that a gap is present between adjacent teeth. A treatment plan may entail moving the adjacent teeth on either side of the gap together to shrink the gap. It may be difficult to move the adjacent teeth closer together with a single loop due to the size of the gap. Accordingly, in some variants, a double loop (e.g., w-loop) may be disposed between adjacent connectors of the archform to move adjacent teeth more efficiently than a single loop. In some variants, the double loop may be able to move adjacent teeth more than would be possible with a single loop. In some variants, the archform can be directly bonded to a patient's teeth without brackets.

In some variants, a tooth being moved by an archform may begin to tip from the application of orthodontic forces, which may result from root drag. For example, a tooth includes a root that extends below the gums and into a socket of the jaw bone. A root may constitute about two-thirds of a tooth. The root can anchor the tooth in position. A treatment plan, however, may entail moving one or more teeth of a patient. Accordingly, orthodontic brackets may be coupled to a patient's teeth and an archform coupled to the orthodontic brackets to apply forces to the patient's teeth to move the teeth toward a planned alignment. Because orthodontic brackets are usually bonded to the portion of a patient's teeth above the gums, the archform may apply forces to the occlusal portions (e.g., top third) of patient's teeth. With the teeth anchored by the roots, the teeth may tip (e.g., pivot) rather than translate. Accordingly, in some variants, an archform may include a hook that may extend in an occlusal direction. One or more elastics (e.g., springs, bands, nickel titanium springs, etc.) may be coupled to the hook to apply forces to a patient's tooth at or closer to the center of resistance of the tooth, which may result in less or even no tipping or rotation of the tooth while translating the tooth. The hook may extend from the connector. In some variants, the spring force from the one or more elastics may counteract the tipping of the tooth. In some variants, the one or more elastics may apply a force on the hook that may apply a tipping force on the tooth (e.g., the force applied to the hook is occlusal relative to the center of resistance of the tooth) but the potential energy of the one or more elastics may also apply a force on a feature (e.g., tab, protrusion, flange, protuberance, projection, jut out, kick out, secondary hook, tooth, etc.) to counteract the tipping. In some variants, the archform can be directly bonded to a patient's teeth without brackets.

In some variants, an archform for moving teeth of a patient is disclosed herein. The archform can include a first connector and a second connector. The first connector and the second connector can be coupled to first and second brackets disposed on the teeth of the patient such that the archform does not slide relative to the first and second brackets. The archform can include an interproximal segment that can be disposed between and connecting the first connector and the second connector. The interproximal segment can include a double loop.

In some variants, the double loop can include a first loop and a second loop.

In some variants, the double loop can consists of a first loop and a second loop.

In some variants, the first loop and the second loop can be open in an occlusal direction.

In some variants, the first loop can include a first portion and a second portion. The first portion of the first loop can extend in a gingival direction from the first connector to a first gingival point. The second portion of the first loop can extend in an occlusal direction from the first gingival point to an intermediate point. The second loop can include a first portion and a second portion. The first portion of the second loop can extend in a gingival direction from the intermediate point to a second gingival point. The second portion of the second loop can extend in the occlusal direction from the second gingival point to the second connector.

In some variants, the intermediate point can be gingivally positioned relative to the first connector and the second connector.

In some variants, the intermediate point can be gingivally positioned relative to midlines of the first connector and the second connector. The midlines can extend in the mesial-distal direction.

In some variants, the intermediate point can be gingivally positioned relative to an occlusal half of the first connector and the second connector.

In some variants, the intermediate point can be gingivally positioned relative to an occlusal three quarters of the first connector and the second connector.

In some variants, the intermediate point can be gingivally positioned relative to arms of the first connector and the second connector.

In some variants, the first and second gingival points can be gingivally positioned relative to the first connector and the second connector.

In some variants, the first and second gingival points can be gingivally positioned relative to midlines of the first connector and the second connector. The midlines can extend in the mesial-distal direction.

In some variants, the first and second gingival points can be gingivally positioned relative to an occlusal half of the first connector and the second connector.

In some variants, the first and second gingival points can be gingivally positioned relative to an occlusal three quarters of the first connector and the second connector.

In some variants, the first and second gingival points can be gingivally positioned relative to arms of the first connector and the second connector.

In some variants, the intermediate point can be occlusally positioned relative to the first gingival point and the second gingival point.

In some variants, the intermediate point can be gingivally positioned relative to a first connection between the first connector and the interproximal segment.

In some variants, the intermediate point can be gingivally positioned relative to a second connection between the second connector and the interproximal segment.

In some variants, the first connector comprises a pair of arms that can be disposed on mesial and distal sides of the first bracket. The first portion of the first loop can extend gingivally from a portion of the first connector that is occlusally positioned relative to one arm of the pair of arms.

In some variants, the first connector can include a pair of arms that can be disposed on mesial and distal sides of the first bracket. The first portion of the first loop can extend gingivally from one arm of the pair of arms.

In some variants, the interproximal segment can be a first interproximal segment. The archform can further include a third connector, a fourth connector, and a second interproximal segment disposed between and connecting the third connector and the fourth connector. The third connector can include a pair of arms that can be disposed on mesial and distal sides of a portion of a third bracket. The second interproximal segment can include a loop. The second interproximal segment can extend gingivally from one arm of the pair of arms of the third connector.

In some variants, the archform can include a fifth connector and a third interproximal segment disposed between the third connector and the fifth connector. The third interproximal segment can include a loop. The third interproximal segment can extend gingivally from the other arm of the pair of arms of the third connector.

In some variants, the archform can include another connector. The another connector can include a hook that can be coupled with one or more elastics to apply forces to the patient's teeth.

In some variants, the another connector can include a pair of arms. The hook can be directly connected to and extends gingivally from one of the pair of arms.

In some variants, the another connector can include a pair of arms. The hook can be directly connected to and extends gingivally from both of the pair of arms.

In some variants, the archform can include adjacent connectors that can be coupled with orthodontic brackets and an additional interproximal segment disposed between and connecting the adjacent connectors. The additional interproximal loop can include an enlarged loop.

In some variants, the enlarged loop can include a first portion, a second portion, and an intermediate point. The first portion of the enlarged loop can extend gingivally from one of the adjacent connectors to the intermediate point of the enlarged loop. The second portion of the enlarged loop can extend occlusally from the intermediate point to the other of the adjacent connectors.

In some variants, the intermediate point can be gingivally positioned relative to the adjacent connectors.

In some variants, the intermediate point can be gingivally positioned relative to midlines of the adjacent connectors. The midlines can extend in the mesial-distal direction.

In some variants, the intermediate point can be gingivally positioned relative to an occlusal half of the adjacent connectors.

In some variants, the intermediate point can be gingivally positioned relative to an occlusal three quarters of the adjacent connectors.

In some variants, the intermediate point can be gingivally positioned relative to arms of the adjacent connectors.

In some variants, an archform for moving teeth of a patient is disclosed herein. The archform can include a first connector and a second connector. The first connector and the second connector can be coupled to first and second brackets disposed on the teeth of the patient such that the archform does not slide relative to the first and second brackets. The archform can include an interproximal segment disposed between and connecting the first connector and the second connector. The interproximal segment can consists of a double loop.

In some variants, an archform for moving teeth of a patient is disclosed herein. The archform can include a first connector and a second connector. The first connector and the second connector can each include a pair of arms. The first connector and the second connector can be coupled to first and second brackets disposed on teeth of the patient such that the archform does not slide relative to the first and second brackets with the pair of arms of each of the first and second connectors disposed on mesial and distal surfaces of the first and second brackets, respectively. The archform can include an interproximal segment that can include a loop. The interproximal segment can be disposed between and connect the first connector and the second connector. The interproximal segment can extend gingivally from one arm of the pair of arms of the first connector.

In some variants, the interproximal segment can be a first interproximal segment. The archform can further include a third connector and a second interproximal segment disposed between and connecting the third connector and the first connector. The second interproximal segment can include a loop and extend gingivally from the other arm of the pair of arms of the first connector.

In some variants, the interproximal segment can extend gingivally from one arm of the pair of arms of the second connector.

In some variants, the archform can include a double loop that can be disposed between two adjacent connectors.

In some variants, the archform can include another connector. The another connector can include a hook that can be coupled with one or more elastics to apply forces to the patient's teeth.

In some variants, the another connector can include a pair of arms. The hook can be directly connected to and extends gingivally from one of the pair of arms.

In some variants, the another connector can include a pair of arms. The hook can be directly connected to and extends gingivally from both of the pair of arms.

In some variants, the loop of the interproximal segment can include an opening that can be open in an occlusal direction. The opening can be narrower in a mesial-distal direction compared to more gingivally inside the loop.

In some variants, the loop of the interproximal segment can include a tear-drop shape.

In some variants, the archform can further include adjacent connectors and another interproximal segment disposed between and connecting the adjacent connectors. The another interproximal segment can include a loop that can include an opening that is open in an occlusal direction. The opening can narrower in a mesial-distal direction compared to more gingivally inside the loop.

In some variants, the archform can include adjacent connectors and another interproximal segment disposed between and connecting the adjacent connectors. The another interproximal segment can include a loop that can have a tear-drop shape.

In some variants, an archform for moving teeth of a patient is disclosed herein. The archform can include a first connector and a second connector. The first connector can include a hook that can be coupled with one or more elastics to apply a force to the teeth of the patient. The first connector and the second connector can be coupled to first and second brackets disposed on teeth of the patient such that the archform does not slide relative to the first and second brackets. The archform can include an interproximal segment that can include a loop and be disposed between and connecting the first connector and the second connector.

In some variants, the second connector can include a hook. The hook of the second connector can be coupled to the hook of the first connector by the one or more elastics.

In some variants, the hook of the first connector can extend gingivally from the first connector.

In some variants, the hook of the second connector can extend gingivally from the second connector.

In some variants, the hook of the first connector can extend gingivally from the first connector to a curved portion and then in one of a mesial direction or a distal direction.

In some variants, the hook can extend in an occlusal direction from the curved portion.

In some variants, the hook of the first connector can include an enlarged end portion that can retain the one or more elastics on the hook of the first connector.

In some variants, the hook of the first connector can include a protrusion that can prevent the one or more elastics from moving in an occlusal direction.

In some variants, the hook of the first connector can include a protrusion that can contact the one or more elastics to counteract tipping of a tooth of the patient's teeth due to the force applied by the one or more elastics on the hook of the first connector.

In some variants, the protrusion can extend from the hook in a mesial direction.

In some variants, the protrusion can extend from the hook in a distal direction.

In some variants, the first connector can include a pair of arms. The hook of the first connector can extend gingivally from one of the pair of arms.

In some variants, the first connector can include a pair of arms. The hook of the first connector can extend gingivally from both of the pair of arms.

In some variants, the pair of arms of the first connector can be disposed on mesial and distal surfaces of the first bracket.

In some variants, the hook of the first connector can contact a surface of the first bracket to increase the rigidity of the hook of the first connector.

In some variants, the one or more elastics can include a continuous spring.

In some variants, the one or more elastics can include a nickel titanium tension spring.

In some variants, the archform can include adjacent connectors and another interproximal segment disposed between and connecting the adjacent connectors. The adjacent connectors can be coupled with orthodontic brackets. The another interproximal segment can include a double loop.

In some variants, the archform can include adjacent connectors and another interproximal segment disposed between and connecting the adjacent connectors. The adjacent connectors can be coupled to orthodontic brackets and each can include a pair of arms extending in a gingival direction. The another interproximal segment can extend gingivally from one arm of the pair of arms of one of the adjacent connectors.

In some variants, the archform can include a further interproximal segment that can extend gingivally from the other arm of the pair of arms of the one of the adjacent connectors.

In some variants, the hook of the first connector can position the force applied by the one or more elastics closer to a center of resistance of a tooth coupled to the first bracket compared to positioning the force applied by the one or more elastics at the first bracket.

In some variants, the archform can be disposed on a lingual side of a patient's teeth.

In some variants, the archform can include a shape memory material.

In some variants, the shape memory material can include nickel titanium.

In some variants, the archform can include a custom nonplanar shape that can move the patient's teeth to a digitally planned alignment.

In some variants, the archform can include a consistent thickness in a lingual-buccal direction.

In some variants, the techniques described herein relate to an archform for moving teeth of a patient, the archform including: a first connector and a second connector, the first connector and the second connector configured to be coupled to first and second brackets disposed on the teeth of the patient such that the archform does not slide relative to the first and second brackets; and an interproximal segment disposed between and connecting the first connector and the second connector, wherein the interproximal segment includes at least two interproximal members.

In some variants, the techniques described herein relate to an archform, wherein the interproximal segment includes an occlusal interproximal member and a gingival interproximal member.

In some variants, the techniques described herein relate to an archform, wherein the occlusal interproximal member and the gingival interproximal member are each connected to the first connector and the second connector.

In some variants, the techniques described herein relate to an archform, wherein a first portion of the interproximal segment extends from the first connector and diverges at a divergence point into the occlusal interproximal member and the gingival interproximal member, wherein the occlusal interproximal member and the gingival interproximal member meet at a convergence point along the interproximal segment, and wherein a second portion of the interproximal segment after the convergence point connects to the second connector.

In some variants, the techniques described herein relate to an archform, wherein the first portion connects to the first connector at a gingival arm of the first connector.

In some variants, the techniques described herein relate to an archform, wherein the first portion is directly connected to and extend gingivally from a gingival portion of a gingival arm of the first connector.

In some variants, the techniques described herein relate to an archform, wherein the first portion connects to the first connector proximal to a contact surface.

In some variants, the techniques described herein relate to an archform, wherein the first portion connects to the first connector on a lingual surface of the first connector.

In some variants, the techniques described herein relate to an archform, wherein the second portion connects to the second connector at a gingival arm of the second connector.

In some variants, the techniques described herein relate to an archform, wherein the second portion is directly connected to and extend gingivally from a gingival portion of a gingival arm of the second connector.

In some variants, the techniques described herein relate to an archform, wherein the second portion connects to the second connector proximal to a contact surface.

In some variants, the techniques described herein relate to an archform, wherein the second portion connects to the second connector on a lingual surface of the first connector.

In some variants, the techniques described herein relate to an archform, wherein the occlusal interproximal member and the gingival interproximal member curve in a gingival direction.

In some variants, the techniques described herein relate to an archform, wherein the occlusal interproximal member curves in an occlusal direction and the gingival interproximal member curves in a gingival direction.

In some variants, the techniques described herein relate to an archform, wherein the occlusal interproximal member includes a first occlusal portion joined to a second occlusal portion at an occlusal intermediate point.

In some variants, the techniques described herein relate to an archform, wherein the occlusal intermediate point is a gingival-most point of the occlusal interproximal member.

In some variants, the techniques described herein relate to an archform, wherein the occlusal intermediate point is an occlusal-most point of the occlusal interproximal member.

In some variants, the techniques described herein relate to an archform, wherein the first occlusal portion extends in a gingival direction.

In some variants, the techniques described herein relate to an archform, wherein the second occlusal portion extends from the occlusal intermediate point in an occlusal direction.

In some variants, the techniques described herein relate to an archform, wherein the first occlusal portion extends in an occlusal direction.

In some variants, the techniques described herein relate to an archform, wherein the second occlusal portion extends from the occlusal intermediate point in a gingival direction.

In some variants, the techniques described herein relate to an archform, wherein the first occlusal portion and the second occlusal portion extend in opposing directions.

In some variants, the techniques described herein relate to an archform, wherein the gingival interproximal member includes a first gingival portion joined to a second gingival portion at a gingival intermediate point.

In some variants, the techniques described herein relate to an archform, wherein the gingival intermediate point is a gingival-most point of the gingival interproximal member.

In some variants, the techniques described herein relate to an archform, wherein the gingival intermediate point is an occlusal-most point of the gingival interproximal member.

In some variants, the techniques described herein relate to an archform, wherein the first gingival portion extends in a gingival direction.

In some variants, the techniques described herein relate to an archform, wherein the second gingival portion extends in an occlusal direction from the gingival intermediate point.

In some variants, the techniques described herein relate to an archform, wherein the first gingival portion extends in an occlusal direction.

In some variants, the techniques described herein relate to an archform, wherein the second gingival portion extends in a gingival direction.

In some variants, the techniques described herein relate to an archform, wherein the first gingival portion and the second gingival portion extend in opposing directions.

In some variants, the techniques described herein relate to an archform, wherein the occlusal interproximal member includes a double loop.

In some variants, the techniques described herein relate to an archform and 102, wherein the gingival interproximal member includes a double loop.

In some variants, the techniques described herein relate to an archform, wherein the occlusal interproximal member and the gingival interproximal member further include an occlusal member width and a gingival member width, and wherein the occlusal member width and the gingival member width are measured in a lingual-buccal direction.

In some variants, the techniques described herein relate to an archform, wherein the occlusal member width and the gingival member width are constant along a length of the occlusal interproximal member and the gingival interproximal member.

In some variants, the techniques described herein relate to an archform, wherein the occlusal member width varies along a length of the occlusal interproximal member.

In some variants, the techniques described herein relate to an archform, wherein the gingival member width varies along a length of the gingival interproximal member.

In some variants, the techniques described herein relate to an archform, wherein the occlusal member width and the gingival member width are constant along the occlusal interproximal member and the gingival interproximal member.

In some variants, the techniques described herein relate to an archform, wherein a gingival-most surface of the occlusal interproximal member has a width different than an occlusal-most surface of the occlusal interproximal member.

In some variants, the techniques described herein relate to an archform, wherein a gingival-most surface of the gingival interproximal member has a width different than an occlusal-most surface of the gingival interproximal member.

In some variants, the techniques described herein relate to an archform, wherein a lingual-most surface of the occlusal interproximal member has a height in an occlusal-gingival direction different than a buccal-most surface of the occlusal interproximal member.

In some variants, the techniques described herein relate to an archform, wherein a lingual-most surface of the gingival interproximal member has a height in an occlusal-gingival direction different than a buccal-most surface of the gingival interproximal member.

BRIEF DESCRIPTION OF THE DRAWINGS

These drawings are illustrative embodiments and do not present all possible embodiments of this invention. The illustrated embodiments are intended to illustrate, but not to limit, the scope of protection. Various features of the different disclosed embodiments can be combined to form further embodiments, which are part of this disclosure.

DETAILED DESCRIPTION

Figure 1:
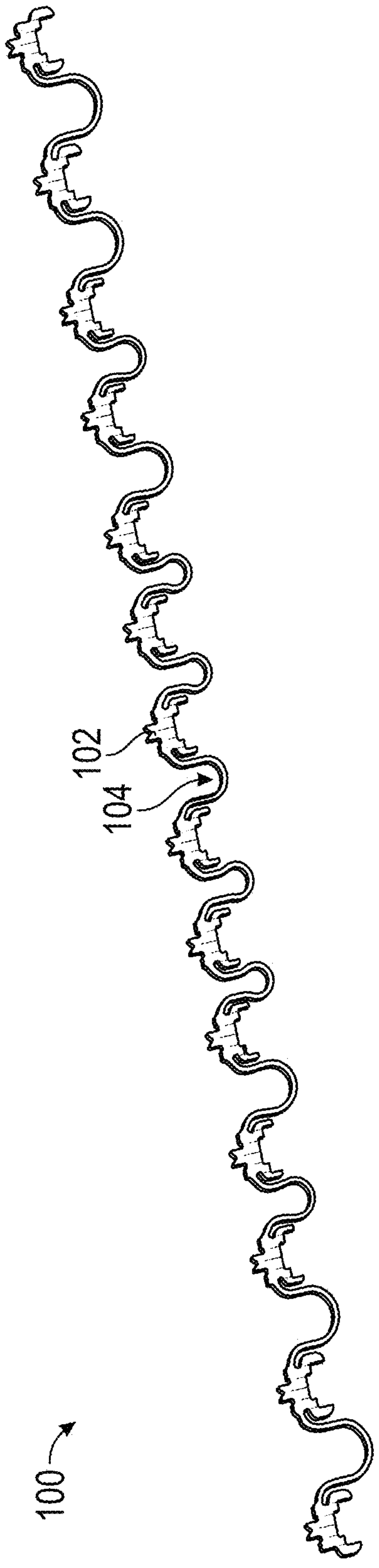
FIG. 1 illustrates an archform.

Malocclusion of the teeth may be treated using orthodontic brackets and archforms to move the patient's teeth using sliding or non-sliding mechanics, as described in U.S. patent application Ser. No. 17/303,860, filed Jun. 9, 2021, now published as U.S. Publication No. 2021/0401548, the entirety of which is hereby incorporated by reference herein. Scans of a patient's teeth can be taken and a digital model (e.g., virtual model) of the patient's teeth can be created, at least in part, from the scans. The teeth of the digital model can be moved from positions of malocclusion (e.g., first positions) to second positions, which may be a planned alignment of the teeth, such as a final planned alignment of the teeth.

Digital brackets can be placed, respectively, on the lingual or buccal surfaces of the teeth in the digital model. In some variants, the digital brackets can be placed before moving the teeth of the digital model from the positions of malocclusion (e.g., first positions) to the second positions (e.g., planned alignment). The positions of the digital brackets on the teeth of the digital model in the second positions can correspond to a custom shape of an archform that can move the patient's teeth from the first positions of malocclusion to the second positions. For example, digital markers can be positioned on and/or in the digital brackets to indicate positions for the connectors of the archform with the archform in a custom 3D shape that can move the patient's teeth to the second positions. In some variants, the digital brackets may include features to indicate placement of the digital markers. In some variants, a software program may automatically place the digital markers on and/or in the digital brackets. In some variants, the digital brackets may include digital markers. In some variants, no digital brackets are used and the positions of the teeth in the digital model can correspond to a custom shape of an archform that can move the patient's teeth from the first positions to the second positions. For example, the digital markers can be positioned on and/or proximate the digital teeth in the digital model without digital brackets.

A system can include a plurality of arms and a robot that can custom 3D shape an archform based on the digital model. For example, the robot can indicate a position for each of the plurality of arms in space that corresponds to a position of a digital marker disposed on and/or in a digital bracket in the digital model. As described herein, each digital marker can correspond to a connector of the archform. An operator can move each of the plurality of arms to a position indicated by the robot. The operator can couple the archform to each of the plurality of arms such that the archform assumes a custom 3D shape corresponding to the positions of the digital markers. In some variants, the plurality of arms can automatically move to positions indicated by the robot. In some variants, the robot can couple the archform to each of the plurality of arms. In some variants, the plurality of arms can automatically move to positions corresponding to the positions of the digital markers in the digital model with the teeth in the second positions without the robot indicating the positions. In some variants, the system can be used to custom 3D shape an archform based on the positioning of digital markers on digital teeth in the digital model without digital brackets. In some variants, a digital archform can be designed in the digital model with the teeth of the digital model in the second positions and the system can custom shape the archform based on the digital archform. In some variants, the system and/or digital model can compensate for material characteristics of the archform. For example, the forces exerted by the archform to move the patient's teeth toward the second positions may decrease as the patient's teeth get closer to the second positions to the extent that, if not taken into account, the archform may be unable to completely move the patient's teeth to the second positions. Accordingly, the archform can be custom 3D shaped to compensate for these decreasing forces. For example, absent the reactionary forces of the patient's teeth in the second positions, connectors of the custom-shaped archform may be positioned beyond the positions of the corresponding digital markers, digital brackets, and/or digital teeth of the digital model in the planned alignment to compensate for the decreasing forces.

The archform, which may also be referred to as an archwire, can be made of a shape memory material, such as a shape memory alloy (e.g., nickel-titanium alloy such as Nitinol) and/or a shape memory polymer. The archform can be cut (e.g., laser, waterjet, plasma cut, punching, etc.) from a sheet of material (e.g., shape memory material). In some variants, the archform can be bent with a wire bender from a wire of material (e.g., shape memory material). The archform can include connectors (e.g., bracket connectors, anchors) that can be coupled to brackets or bonded directly to teeth and interproximal segments (e.g., interproximal loops) that can be disposed between connectors and can move one or more teeth of the patient. When cut from the sheet of material, the archform can have a substantially flat two-dimensional shape and/or otherwise planar shape. When the wire is bent with the wire bender, the archform can have a substantially flat two-dimensional shape and/or otherwise planar shape. The archform can be deflected from the two-dimensional shape and coupled, as detailed herein, to the holders of the plurality of arms of the system to assume the custom nonplanar shape. For example, the connectors of the archform can be coupled to the holders of the plurality of arms such that the connectors are in positions corresponding to the positions of the digital markers in the digital model of the patient's teeth in the second positions.

While retained in the custom nonplanar shape by the holders of the plurality of arms, the archform can be heat set. The setting of the archform can be accomplished by way of exposure to heat with a heating element, which can at least be accomplished with an oven, furnace, heat gun, and/or other suitable devices. For example, the robot can apply heat to the archform with a heating element, such as a heat gun. In some variants, electrical current can be applied to the archform to set the archform in the custom shape. Setting the archform can set a new default or memorized shape (e.g., configuration) for the archform such that the archform is biased toward the default or memorized shape when deflected therefrom. Accordingly, if the archform is deflected from the memorized custom nonplanar shape, the archform can exert forces to return the archform back to the memorized custom nonplanar shape. The archform can also be heat treated to set a transition temperature such that the archform is pliable at room temperature but rigid at and/or near body temperature. For example, the archform in the custom nonplanar shape can have a transformation temperature set such that the material is in the martensite phase when the temperature of the archform is between 65 and 75 degrees Fahrenheit, which can correspond with room temperature, and austenite phase when the temperature of the archform is between 97 and 99 degrees Fahrenheit, which can correspond with body temperature. This can enable an archform to be in the martensite phase and pliable as the archform is installed in a patient's mouth (e.g., coupled to brackets disposed on the patient's teeth), but once the patient's mouth warms the archform above the transformation temperature, the archform can be in the austenite phase and activate, e.g., spring, toward the memorized custom nonplanar shape, which can move the patient's teeth toward an alignment (e.g., the second positions, which can be a final alignment). Separate portions of the archform can be heat-set or configured to respond to different temperatures, such that only some portions of the archform respond or deform at a certain temperature, whereas other portions of the archform respond or deform at another temperature.

An indirect bonding (IDB) tray can be formed based on the digital model. The teeth of the digital model, with the digital brackets disposed thereon, can be returned back to the positions of malocclusion that can reflect the current positions of the patient's teeth. In some variants, the IDB tray can be formed based on the digital model with digital brackets placed on the maloccluded teeth of the digital model prior to movement of the teeth to the second positions. An IDB tray can be 3D printed based on the digital model and/or over molded on a physical model of the patient's teeth. The IDB tray can be sized and shaped to fit over the teeth of the patient. The IDB tray can include wells (e.g., pockets, recesses, etc.) that can house orthodontic brackets therein. The wells can be positioned based on the corresponding positioning of the digital brackets in the digital model.

Orthodontic brackets can be placed in respective wells of the IDB tray with contact surfaces (e.g., bonding surfaces) exposed. An adhesive can be applied to the contact surfaces and the loaded IDB tray can be placed over the teeth of the patient, positioning the orthodontic brackets at locations on the teeth of the patient that correspond to the positioning of the digital brackets on the teeth in the digital model in the first positions. The orthodontic brackets can be bonded to the teeth of the patient, which can be facilitated by exposing the adhesive to air, light (e.g., UV light), heat, low temperatures, and/or chemical(s).

With the orthodontic brackets bonded to the teeth of the patient, the custom shaped archform can be deflected from the custom 3D shape and coupled to the bonded orthodontic brackets. The connectors of the archform can be coupled, e.g., locked, to the bonded orthodontic brackets such that the archform does not slide with respect to the brackets. As described herein, the deflected archform can exert forces on the teeth of the patient as the archform exerts forces to move back toward the undeflected position (e.g., memorized custom nonplanar shape), which can move the teeth of the patient, using non-sliding mechanics, toward seconds positions that correspond to the second positions of the teeth in the digital model (e.g., planned alignment of the teeth). In some variants, the archform can be deflected from the custom nonplanar shape and bonded directly to the patient's teeth, including buccal or lingual surfaces.

In some variants, a series of archforms can be sequentially installed in the patient's mouth (e.g., coupled to the brackets) and replaced to move the patient's teeth from positions of malocclusion to the second positions. For example, an initial archform set in the custom nonplanar shape may be used for an initial stage of treatment for initially moving the teeth of the patient toward the second positions. An intermediate archform set in the custom nonplanar shape, which may be stiffer than the initial archform, may be used for an intermediate stage of treatment for moving the teeth of the patient closer toward the second positions. A final archform set in the custom nonplanar shape, which may be stiffer than the intermediate archform, may be used for a final stage of treatment for moving the teeth of the patient closer toward or to the second positions. In some variants, the interproximal segments, which can include interproximal loops, can be increasingly stiffer with each successive archform (e.g., the interproximal segments of the intermediate archform are stiffer than those of the initial archform). In some variants, one archform is used in a treatment plan instead of multiple. In some variants, two, three, four, five, or more archforms may be used for each arch (e.g., upper and lower arches) in a treatment plan. Malocclusion of the teeth may be treated using one or more archforms to move the patient's teeth using non-sliding and/or sliding mechanics.

FIG. 1 illustrates an example embodiment of an archform 100, which can also be referred to as an archwire. The illustrated embodiment of the archform 100 along with other embodiments of the archform are described in U.S. patent application Ser. No. 17/303,860, filed Jun. 9, 2021, now published as U.S. Publication No. 2021/0401548, the entirety of which is hereby incorporated by reference herein. The archform 100 can have a polygonal (e.g., rectangular, square), circular, oval, irregular, and/or other shaped cross-section. The archform 100, as described herein, can be cut (e.g., laser, waterjet, punching, etc.) from a sheet of material, such as shape memory material, which can include shape memory alloys (e.g., nickel titanium such as Nitinol) and/or shape memory polymers. The archform 100, as illustrated in FIG. 1, has a planar (e.g., flat) shape. The archform 100 can correspond to a segment of an upper or lower dental arch of a patient. The archform 100 can correspond to an entirety of an upper or lower dental arch of a patient.

The archform 100 can include a plurality of connectors or connector portions 102 (e.g., bracket connectors, anchors) that can be coupled to orthodontic brackets to install the archform 100 in the mouth of a patient and/or be directly bonded to a patient's teeth without an orthodontic bracket.

The archform 100 can include a plurality of interproximal segments 104. The interproximal segments 104 can be disposed between adjacent connectors 102. The interproximal segments 104 can correspond to interdental spaces between adjacent teeth of the patient. The interproximal segment 104 can include loops. The loops can extend in a gingival direction when the archform 100 is installed in the mouth, which can improve aesthetics and/or facilitate flossing. The loops can open to move adjacent teeth apart from each other. The loops can close to move adjacent teeth closer together. The loops can be various shapes, including U, T, tear-drop, triangular, rectangular, boot, and/or others. The loops of the archform 100 can have varying rigidity. For example, the forces to move molars may be greater than other teeth; accordingly, the loops adjacent the molars may be more rigid than loops not adjacent molars. The rigidity can vary due to the curvature of the loop, shape of the loop, size of the loop, and/or width. In some variants, the loops of the intermediate archform may be more rigid than corresponding loops of the initial archform, and the loops of the final archform may be more rigid than the corresponding loops of the intermediate archform. The loops can extend (e.g., curve) gingivally down from one connector 102 to an intermediate position and back up occlusally to another adjacent connector 102 such that the loop is open in an occlusal direction, which may be beneficial for flossing.

Figure 2:
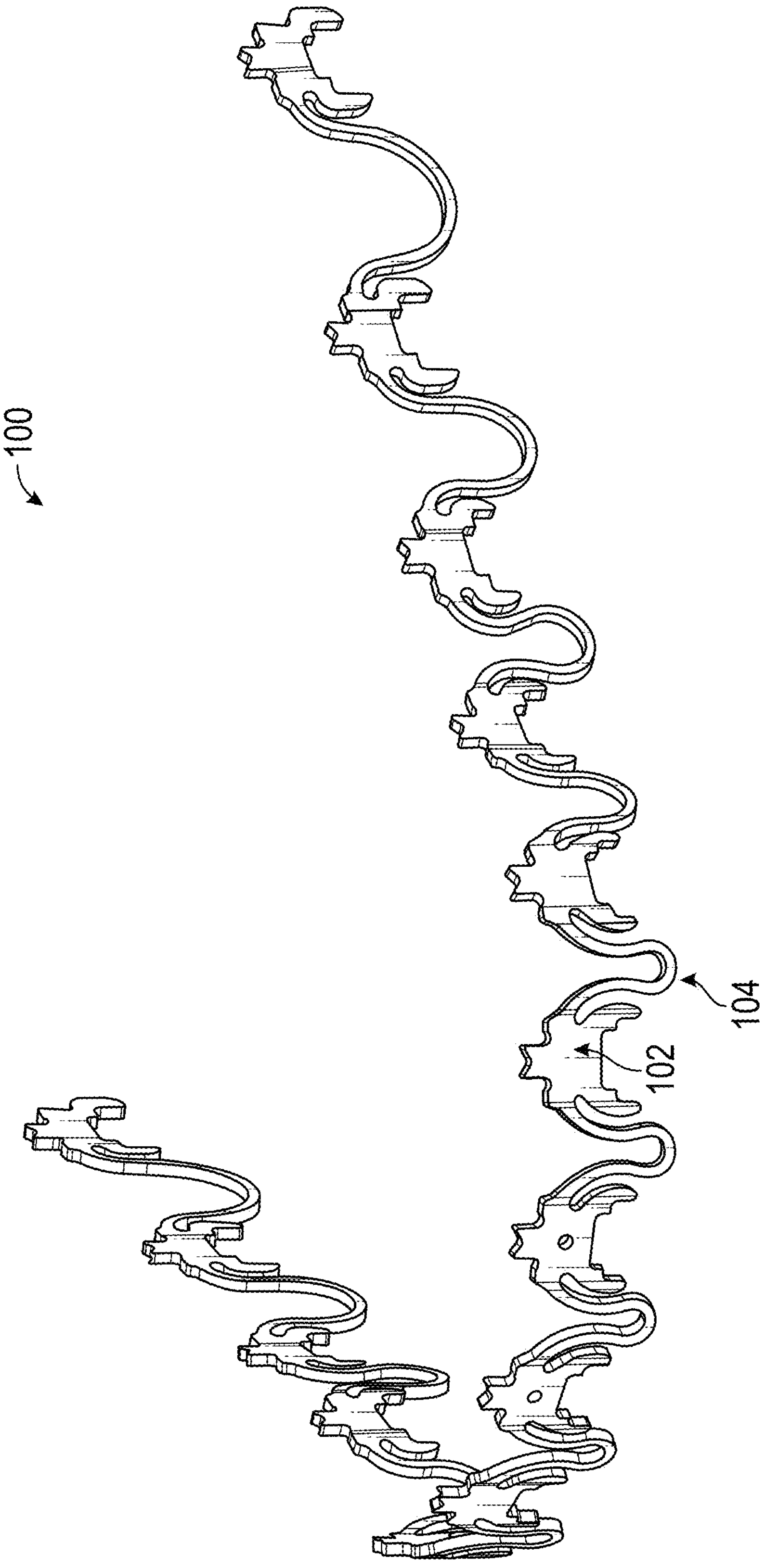
FIG. 2 illustrate the archform in a custom nonplanar shape.

FIG. 2 illustrates the archform 100 in a custom non-planar shape (e.g., custom 3D shape, custom memorize shape, custom memorized 3D shape). The custom non-planar shape can correspond to a planned alignment of a patient's teeth. As described herein, the archform 100 may correspond to a segment or the entirety of a patient's upper or lower dental arch. As illustrated in FIG. 2, the archform 100 has an arch shape.

Figure 3:
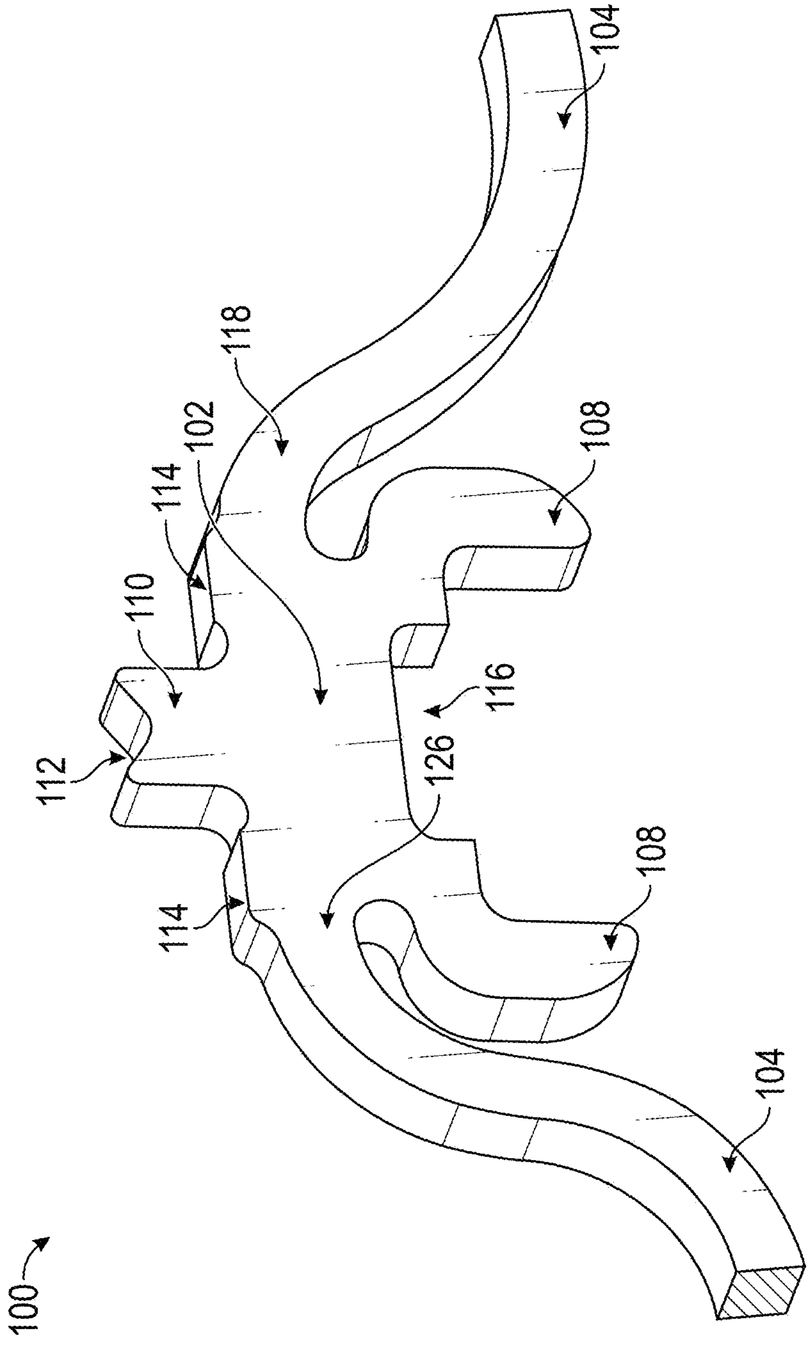
FIG. 3 illustrates a connector of the archform.

FIG. 3 illustrates the connector 102 (e.g., bracket connector, anchor, male fastener, connector portion) of an archform 100. The connector 102 can be coupled to an orthodontic bracket such that the connector 102 does not slide with respect to the orthodontic bracket. In some variants, the connector 102 can be directly coupled (e.g., bonded, adhered) to the tooth of a patient. The connector 102 can be oriented in different orientations to move a tooth of a patient. The connector 102 can be disposed between interproximal segments 104. The interproximal segments 104, as described herein, can apply forces to adjacent connector(s) 102 to move teeth of a patient.

The connector 102 can have arms 108. The arms 108 can extend in a direction that is opposite that of a tab 110 (e.g., tongue) of the connector 102. The arms 108 can extend in at least an occlusal or gingival direction. The arms 108 can grip one or more features of an orthodontic bracket to help secure the connector 102 and/or provide improved control of a tooth of the patient. The arms 108 can grip a retainer of the orthodontic bracket. For example, the arms 108 can grip, hold, grasp, hug, snap around, and/or otherwise interface with the mesial and distal sides of the retainer. In some variants, the arms 108 can hold the archform 100 (e.g., connector 102) in place on the bracket as an operator positions a tool to secure the connector 102 to the bracket. The arms 108 can include outer sides that are curved, which can help the arms 108 to better grip the retainer of the bracket.

A recess 116, also referred to as a gap, can be disposed between the arms 108. The recess 116 can receive a C spring of the orthodontic bracket and/or other feature when the connector 102 is locked into a slot of the orthodontic bracket. The periphery defining at least a portion of the recess 116 can contact the C spring. The C spring can apply a force against the periphery of the recess 116 to push the connector 102 against stops of the bracket which can position a portion of the connector 102 under overhangs of the stops. The connector 102 can include contact surfaces 114 which can contact the stops of the orthodontic bracket. The contact surfaces 114 can be flat to provide a secure point of contact with the stops of the orthodontic bracket. The stops of the orthodontic bracket can have corresponding flat surfaces. The contact surfaces 114 can be disposed on a side of the connector 102 that is opposite the arms 108 and/or recess 116. The contact surfaces 114 can be disposed on opposing sides of the tab 110.

The tab 110 can be disposed on a side of the connector 110 that is opposite the arms 108 and/or recess 116. The tab 110 can be disposed in a gap between stops of the orthodontic bracket when the connector 102 is disposed in the slot of the orthodontic bracket. The tab 110 can contact inner sides of the stops, which can help to prevent sliding of the connector 102 in a mesial-distal direction relative to the orthodontic bracket. The tab 110 can extend in a gingival or occlusal direction. The tab 110 can include a groove 112. The groove 112 can be disposed on an end of the tab 110. The groove 112 can receive a tool to facilitate positioning the connector 102 into the slot of the orthodontic bracket or removing the connector 102 therefrom. The groove 112 can help to prevent inadvertent sliding of the tool being used to place the connector 102 into the slot of the orthodontic bracket. The connector 102 can include curves to reduce stress concentrators.

Figure 4:
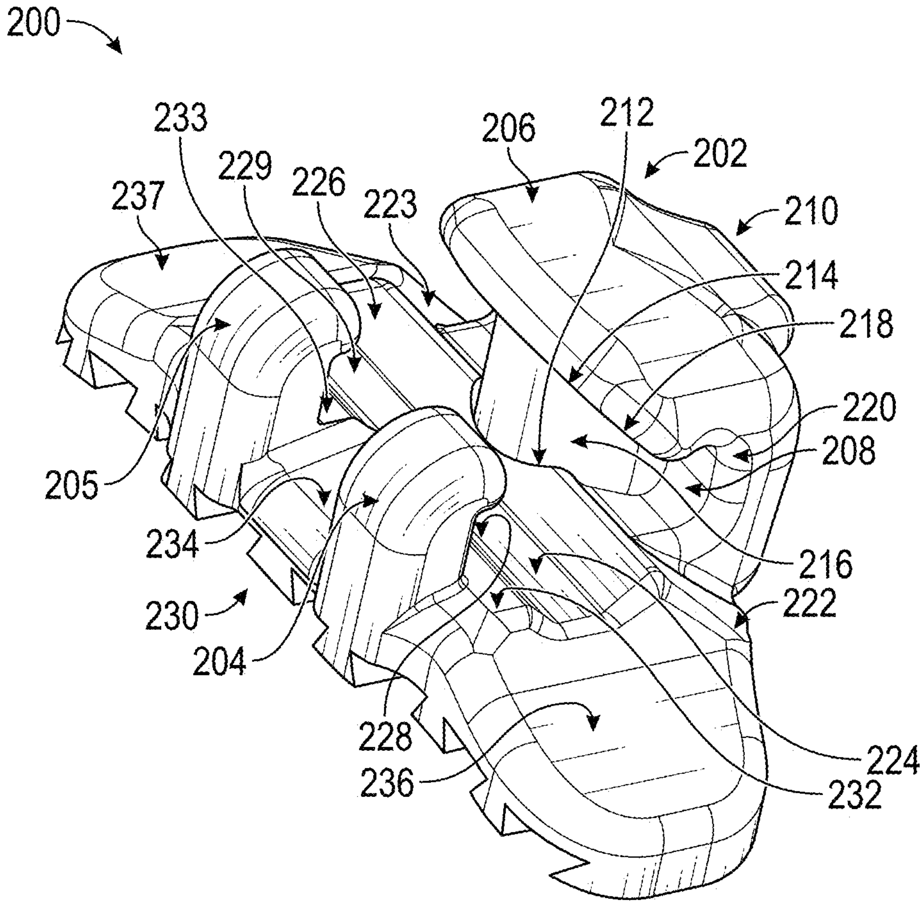
FIG. 4 illustrates an orthodontic bracket.

FIG. 4 illustrates an orthodontic bracket 200. The bracket 200 can be disposed on the lingual or buccal side of a patient's teeth. The bracket 200 can couple with the connector 102 of the archform 100 to facilitate moving a patient's teeth using non-sliding mechanics. In some variants, the bracket 200 can have utility when used with archforms of different configurations than those described herein. The bracket 200 can include a slot 208, also referred to as a receiving region or receiving space, that can receive the connector 102 of the archform 100 therein such that the connector 102 is prevented from sliding relative to the bracket 200 when installed in a patient's mouth. The slot 208 can be positioned between a retainer 202 and stops 204, 205. The slot 208 can be at least partially defined between the retainer 202, stops 204, 205, and a face 224 of the bracket 200.

As described herein, the retainer 202 can help to retain the connector 102 within the slot 208. The retainer 202 can at least be positioned proximate or at a gingival or occlusal side of the bracket 200. The retainer 202 can extend from the face 224 of the bracket 200. The retainer 202 can include one or more features to improve handling the bracket 200. For example, the retainer 202 can have a protuberance 210, also referred to as a bump, protrusion, or engagement region, that can be gripped by a tool during handling of the bracket 200. The protuberance 210 can extend in a gingival or occlusal direction.

The retainer 202 can include one or more features to improve retention of the connector 102 received in the slot 208 of the bracket 200. For example, the retainer 202 can include an overhang 206, e.g., extension. The overhang 206 can help hold the connector 102 within the slot 208. The overhang 206 can be offset from the face 224. The overhang 206 can extend over the slot 208 and/or face 224. The overhang 206 can include a curved portion 214 that extends over the slot 208 and/or face 224 of the bracket 200. The retainer 202 and/or overhang 206 can include an angled surface 218 that can facilitate the connector 102 being positioned within the slot 208 of the bracket 200 at an angle before being rotated toward the face 224 of the bracket 200 and being locked within the bracket 200, such as in the slot 208. The retainer 202 can include a recess 220, also referred to as a gap, undercut, cutout, space, etc., that can facilitate the connector 102 being rotated in and out of the slot 208 of the bracket 200 as detailed herein.

The bracket 200 can include a spring 216 (e.g., lock spring) that can facilitate locking the connector 102 of the archform 100 within the bracket 200. The spring 216 can be a compressible material with resilient properties that can be biased to a certain position. The spring 216 can be a C spring, rounded spring, leaf spring, etc. The spring 216 can be housed within an opening 212. The opening 212 can be disposed through at least a portion of the retainer 202. The C spring 216 can be inserted into the opening 212 by way of a face of the bracket 200 that is opposite the face 224. The C spring 216 can be exposed to the slot 208 such that the connector 102 can contact the C spring 216 when positioned within the slot 208. The C spring 216 can be oriented with a longitudinal axis thereof oriented perpendicularly relative to the plane of the face 224. The opening 212 can be contoured and/or shaped to prevent titling and/or rattling of the C spring 216 within the opening 212. The opening 212 can be bounded by a periphery that can help to prevent the C spring 216 from deflecting beyond a desired range (e.g., beyond elastic deformation). With the connector 102 of the archform 100 in the bracket 200, the C spring 216 can apply a force to the connector 102 that pushes the connector 102 against and/or at least partially under the stops 204, 205 such that the connector 102 is locked within the slot 202 of the bracket 200.

The stops 204, 205 can be proximate an opposite end of the bracket 200 relative to the retainer 202. In some variants, the stops 204, 205 can be in a mirrored configuration about a central plane of the bracket 200. The stops 204, 205 can include receiving spaces 228, 229, respectively. The receiving spaces 228, 229 can be at least partially bounded by extensions (e.g., overhangs) of the stops 204, 205. The receiving spaces 228, 229, which can also be referred to as pockets or cutouts, can receive, respectively, a portion of the connector 102 therein to secure the connector 102 within the slot 208. In some variants, the bracket 200 can include two stops 204, 205. In some variants, the bracket 200 may include one, three, four or more stops that can help retain the connector 102 of the archform 100 within the bracket 200. The stops 204, 205 can be spaced apart from each other, which can be in the mesial-distal direction. A gap 234 can separate the stops 204, 205. The gap 234 can receive the tab 110 of the connector 102, as described herein. The portion of the face 224 spanning the gap 234 can be at least flat, angled, or curved. The portion of the face 224 spanning the gap 234 can be angled relative to other portions of the face 224 and/or curved at an end of the bracket 200.

The bracket 200 can include ramps 232, 233. The ramps 232, 233 can also be referred to as inclined surfaces, protrusions, angled surfaces, wedges, bumps, etc. The ramps 392, 393 can extend away from the face 224 of the bracket 200. The ramps 232, 233 can push the connector 102 against the stops 204, 205 to help secure the connector 102 within the slot 208. The ramps 232, 233 can push the connector 102 against the overhangs of the stops 204, 205. The ramps 232, 233 can include a flat surface that can engage the connector 102 when the connector 102 is secured within the slot 208. In some variants, the ramps 232, 233 can extend beyond a width of the stops 204, 205, respectively, which can help improve rotational control of a tooth.

The bracket 200 can include a protrusion 226 (e.g., bump). The protrusion 226 can extend from the face 224. The protrusion 226 can apply a force against the connector 102, when positioned within the slot 208, to push the connector 102 against the stops 204, 205 and/or overhang 206 of the retainer 202 to help secure the connector 102. The protrusion 226 can extend laterally beyond a width of the retainer 202, which can help improve rotational control of a tooth. The protrusion 226 can extend laterally beyond the stops 204, 205. In some variants, the opening 212 can disrupt a portion of the protrusion 226.

The bracket 200 can include inclined surfaces 222, 223 that can facilitate inserting a connector 102 within the slot 208 of the bracket 200 before rotating the connector 102 toward the face 224 of the bracket 200 to lock the connector 102 into place. The inclined surfaces 222, 223 can be positioned on opposing sides of the retainer 202.

The bracket 200 can include lateral extensions 236, 237, which can also be referred to as lateral wings. The lateral extensions 236, 237 can help the bracket 200 to better control movement of a molar or other tooth. For example, the lateral extensions 236, 237 can facilitate better rotational control. The lateral extensions 236, 237 can also provide more surface area for a textured surface 230 for improved bonding.

The bracket 200 can include a textured surface 230, also referred to as a surface with undercuts, cuts, gaps, voids, and/or slots. The textured surface 230 can be disposed on a side of the bracket 200 that is opposite the face 224. The textured surface 230 can facilitate bonding the bracket 200 to a surface of the patient's teeth. Specifically, an adhesive applied to the textured surface 230 can bond the textured surface 230 to the surface of the patient's tooth. The textured surface 230 can provide an increased surface area to facilitate improved bonding compared to an un-textured surface.

Figure 5:
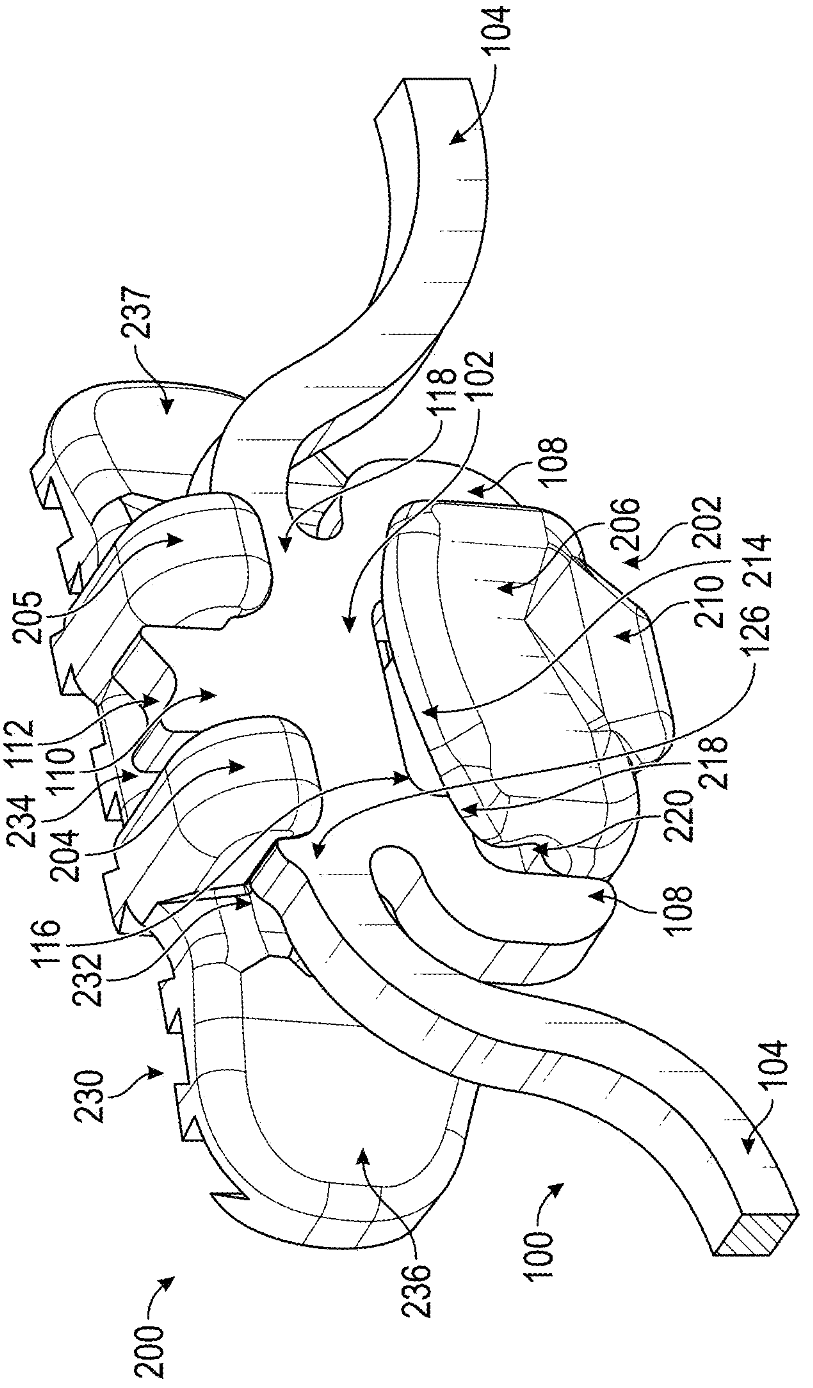
FIG. 5 illustrates the connector of FIG. 3 coupled with the orthodontic bracket of FIG. 4.

FIG. 5 illustrates the connector 102 coupled to the bracket 200. As illustrated, the connector 102 is disposed in the slot 208 of the bracket 200. The C spring 216 can push the connector 102 against the stops 204, 205 and/or under at least a portion of the stops 204, 205. The contact surfaces 114 can contact the stops 204, 205. The force applied by the C spring 216 can lock the connector 102 under the overhangs of the stops 204, 205 and the overhang 206 of the retainer 202.

The bracket 200 and/or connector 102 of the archform 100 can include modifications to accommodate the various teeth of the patient, such as the molars, bicuspids, lower anterior, and upper central teeth.

Figure 6A:
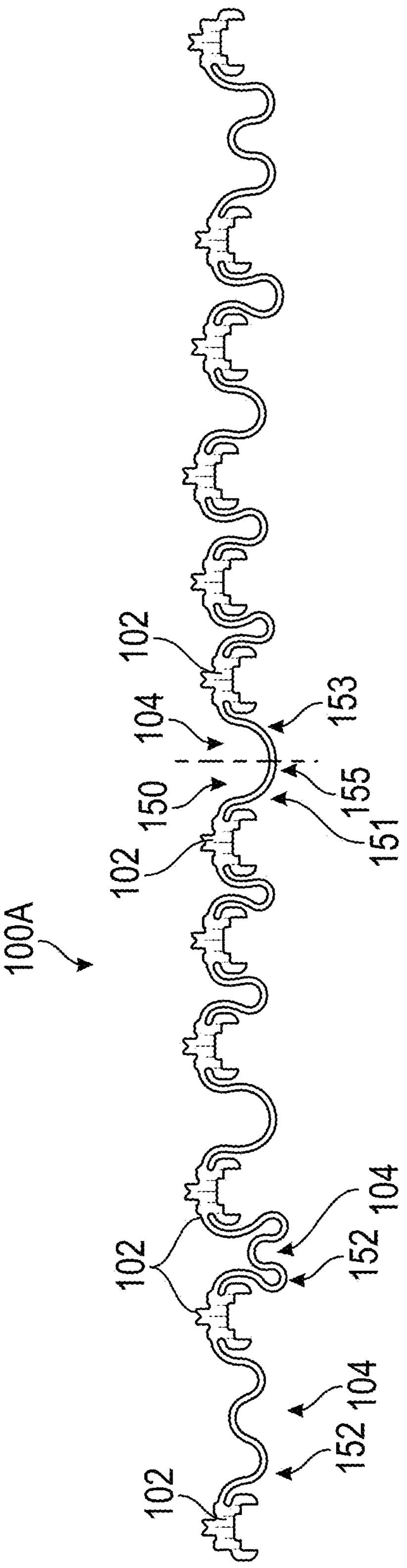
FIG. 6A illustrates an archform with double loops.

FIG. 6A illustrates an archform 100A, which can include any features described in reference to any other archform configuration described herein. As shown, the archform 100A includes a plurality of connectors 102 and interproximal segments 104. The interproximal segments 104 can be disposed between adjacent connectors 102. The interproximal segments 104 can include loops of a variety of shapes and/or sizes, which may be altered based on a treatment plan to move a patient's teeth toward the planned alignment. For instance, a treatment plan may call for a first tooth to move a first distance and a second tooth to move a second distance. The second distance may be larger than the first distance. Accordingly, a loop adjacent the second tooth may be configured to facilitate moving the second tooth a larger distance, which can at least include enlarging the loop and/or including multiple loops.

For example, an interproximal segment 104 may include an enlarged loop 150, which may be larger than other loops of the archform 100A, as illustrated in FIG. 6A. The enlarged loop 150 may have a larger radius compared to other loops of the archform 100A. The enlarged loop 150 may have a lesser curvature compared to other loops of the archform 100A. The enlarged loop 150 may be disposed between and connect adjacent connectors 102. The enlarged loop 150 may include a first portion 151 that extends (e.g., curves) in a gingival direction from a first adjacent connector 102 to an intermediate point 155. The enlarged loop 150 may include a second portion 153 that extends (e.g., curves) in an occlusal direction from the intermediate point 155 to a second adjacent connector 102. The intermediate point 155 may be the junction between the first portion 151 and the second portion 153. The intermediate point 155 may be the gingival-most point along the enlarged loop 150. The intermediate point 155 may be gingivally positioned relative to the adjacent connectors 102. The intermediate point 155 may be gingivally positioned relative to midlines of the adjacent connectors 102, the midlines extending the mesial-distal direction. The midlines may delineate occlusal halves of the adjacent connectors 102. In some variants, the midlines may be collinear. In some variants, one midline may be positioned occlusally relative to the other midline. The intermediate point 155 may be gingivally positioned relative to occlusal halves of one or both of the adjacent connectors 102. The intermediate point 155 may be gingivally positioned relative to occlusal three quarters of one or both of the adjacent connectors 102. The intermediate point 155 may be gingivally positioned relative to arms 108 of one or both of the adjacent connectors 102. The intermediate point 155 may be gingivally positioned relative to one or both brackets coupled to the adjacent connectors.

An interproximal segment 104 may include a double loop 152, which may also be referred to as a W-loop, as illustrated in FIG. 6A. The double loop 152 may include two loops, which may more efficiently move teeth a larger distance compared to a single loop. The two loops may be positioned in series. In some variants, an interproximal segment 104 may include three, four, or more loops. The loops can be various shapes, which can at least include U, V, tear-drop, boot, and/or others. In some variants, an interproximal segment 104 may only consist of a double loop 152.

Figure 6B:
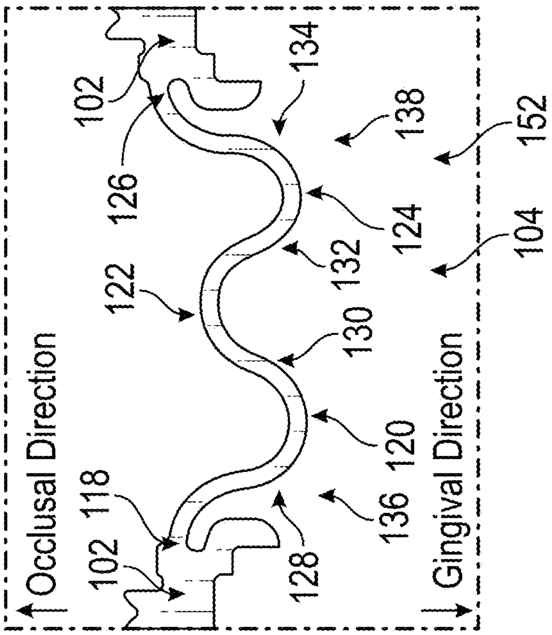
FIG. 6B illustrates an enlarged view of a portion of the archform of FIG. 6A.

As shown in FIG. 6B, the interproximal segment 104 with a double loop 152 may connect to a first connector 102 at a first connection 118 (e.g., junction) and a second connector 102 at a second connection 126. The interproximal segment 104 may connect (e.g., join) two adjacent connectors 102 (e.g., the first and the second connectors 102). The interproximal segment 104 may span the gap between two adjacent connectors 102 (e.g., the first and the second connectors 102). The double loop 152 may include a first loop 136 and a second loop 138. The first loop 136 and the second loop 138 may be disposed in series. The first loop 136 and the second loop 138 may be joined at a curve. In some variants, the first loop 136 and/or the second loop 138 may be open in an occlusal direction. In some variants, the first loop 136 and the second loop 138 may be the same size and/or shape. In some variants, the first loop 136 and the second loop 138 may be different sizes and/or shapes. In some variants, the radius of one of the first loop 136 and second loop 138 can be larger than the radius of the other of the first loop 136 and the second loop 138. In some variants, the curvature of one of the first loop 136 and the second loop 138 can be less than the curvature of the other of the first loop 136 and the second loop 138.

The first loop 136 may include a first portion 128 that extends (e.g., curves) in a gingival direction from the first connection 118 to a first gingival point 120 (e.g., first gingival portion, gingival point). The first gingival point 120 may be disposed gingivally relative to the first connection 118. The first loop 136 may include a second portion 130 that extends (e.g., curves) in an occlusal direction from the first gingival point 120 to an intermediate point 122. The first gingival point 120 may be the junction between the first portion 128 and the second portion 130 of the first loop 136. The first gingival point 120 may be the gingival-most point along the first loop 136.

The intermediate point 122 may be the junction between the first loop 136 and the second loop 138. The intermediate point 122 may, in some variants, be positioned gingivally relative to the first connection 118 and/or second connection 126. The intermediate point 122 may be positioned occlusally relative to the first gingival point 120 and second gingival point 124. The intermediate point 122 may be the occlusal-most point between the first gingival point 120 and the second gingival point 124. The intermediate point 122 may be disposed on a curve joining the first loop 136 and the second loop 138.

The second loop 138 may include a first portion 132 that extends (e.g., curves) in a gingival direction from the intermediate point 122 to the second gingival point 124. The second gingival point 124 may be disposed gingivally relative to the second connection 126. The second loop 138 may include a second portion 134 that extends (e.g., curves) in an occlusal direction from the second gingival point 124 to the second connection 126. The second gingival point 124 may be the junction between the first portion 132 and the second portion 134 of the second loop 138. The second gingival point 124 may be the gingival-most point along the second loop 138.

The intermediate point 122 may be gingivally positioned relative to the adjacent connectors 102 (e.g., the first and the second connectors 102). The intermediate point 122 may be gingivally positioned relative to midlines of the adjacent connectors 102, the midlines extending the mesial-distal direction. The midlines may delineate occlusal halves of the adjacent connectors 102. In some variants, the midlines may be collinear. In some variants, one midline may be positioned occlusally relative to the other midline. The intermediate point 122 may be gingivally positioned relative to occlusal halves of one or both of the adjacent connectors 102. The intermediate point 122 may be gingivally positioned relative to occlusal three quarters of one or both of the adjacent connectors 102. The intermediate point 122 may be gingivally positioned relative to arms 108 of one or both of the adjacent connectors 102. The first gingival point 120 and/or second gingival point 124 may be gingivally positioned relative to the one or both of the adjacent connectors 102. The first gingival point 120 and/or second gingival point 124 may be gingivally positioned relative to the one or both of the midlines of the adjacent connectors 102. The first gingival point 120 and/or second gingival point 124 may be gingivally positioned relative to the occlusal halves of one or both of the adjacent connectors 102. The first gingival point 120 and/or second gingival point 124 may be gingivally positioned relative to the occlusal three quarters of one or both of the adjacent connectors 102. The first gingival point 120 and/or second gingival point 124 may be gingivally positioned relative to one or both of the arms 108 of one or both of the adjacent connectors 102. The intermediate point 122 may be gingivally positioned relative to one or both brackets coupled to the adjacent connectors. The first gingival point 120 and/or second gingival point 124 may be gingivally positioned relative to one or both brackets coupled to the adjacent connectors.

In some variants, the first loop 136 and/or second loop 138 may include an opening that is open in an occlusal direction. The opening, in some variants, may be narrower in a mesial-distal direction compared to more gingivally inside the loop. The first loop 136 and/or second loop 138 may include a tear-drop shape.

Figure 7A:
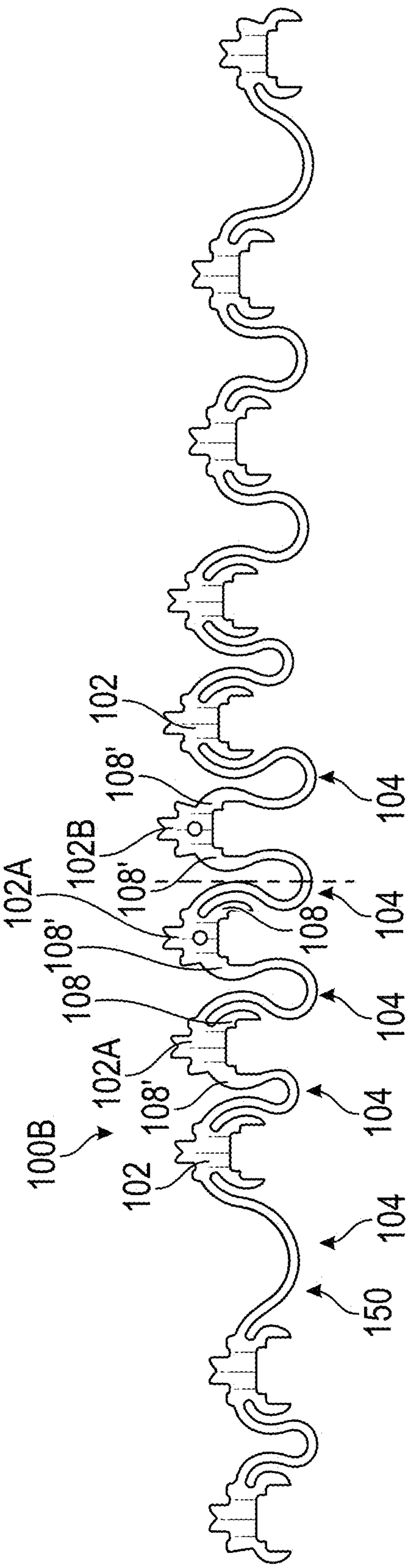
FIG. 7A illustrates an archform for overcrowding.

FIG. 7A illustrates an archform 100B, which can include any features described in reference to any other archform configuration described herein. The archform 100B may be configured for a patient with crowded teeth, such as crowded anterior teeth. Space may be limited for patients with crowded anterior teeth. For example, in some instances, a connector may be directly bonded to a patient's tooth because there may be insufficient surface area available on a tooth to bond a bracket. In some instances, as illustrated in FIG. 7A, the archform 100B may include various connector configurations to accommodate for the crowded teeth (e.g., anterior crowded teeth).

For example, the archform 100B may include one or more connectors 102A that are configured for crowded teeth. The connectors 102A may include any features described in reference to any other connector configuration described herein. The connectors 102A may include two arms, an arm 108 and an arm 108'. The arm 108 of the connector 102A may be the same as the arms 108 of the connector 102. As for the arm 108', the adjacent interproximal segment 104 may be directly connected to the arm 108', as opposed to being directly connected to a portion of the connector 102A that is occlusal relative to the arm 108'. The interproximal segment 104 adjacent the arm 108' may be directly connected to and extend gingivally from a gingival portion of the arm 108'. The loop of the interproximal segment 104 may extend gingivally away from the arm 108'. In some variants, the arm 108' may be wider in a mesial-distal direction compared to the arm 108, which may increase the rigidity of the arm 108'. The outer profile of the arm 108' and connected interproximal segment 104 may be continuous. By the interproximal segment 104 extending gingivally from the arm 108' instead of from the position occlusal of the arm 108', the width of the connector 102A in the mesial-distal direction may be decreased. The width of an occlusal portion of the connector 102A may be decreased. In some variants, the adjacent portion of the connector 102A occlusal of the arm 108' may be cutout. For example, the profile of the connector 102A may be angled inward occlusally of the arm 108', which may further reduce the width of the connector 102A in the mesial-distal direction (e.g., the occlusal portion of the connector 102A).

The archform 100B may include one or more connectors 102B that are configured for crowded teeth. The connectors 102B may include any features described in reference to any other connector configuration described herein. The connectors 102B may include two arms 108', which can be the same as the arm 108' described in reference to the connector 102A. The interproximal segments 104 adjacent the arms 108' may be directly connected to the arms 108', as opposed to being directly connected to portions of the connectors 102B that are occlusal relative to the arm 108' as detailed in reference to other connectors described herein. The interproximal segments 104 adjacent the arms 108' may be directly connected to and extend gingivally from gingival portions of the arms 108'. The loops of the interproximal segments 104 may extend gingivally away from the arms 108'. In some variants, the arms 108' may be wider in a mesial-distal direction compared to arms 108. The outer profile of the arms 108' and connected interproximal segments 104 may be continuous. By the interproximal segments 104 extending gingivally from the arms 108' instead of from positions occlusal of the arms 108', the width of the connector 102B in the mesial-distal direction may be decreased. The width of an occlusal portion of the connector 102B may be decreased. In some variants, the adjacent portions of the connector 102B occlusal of the arms 108' may be cutout. For example, the profile of the connector 102B may be angled inward occlusally of the arms 108', which may further reduce the width of the connector 102B in the mesial-distal direction (e.g., the occlusal portion of the connector 102B). In some variants, one or more of the loops of the interproximal segments 104 may include an opening that is open in an occlusal direction. The opening, in some variants, may be narrower in a mesial-distal direction compared to more gingivally inside the loop. The one or more loops of the interproximal segments 104 may include a tear-drop shape.

Figure 7B:
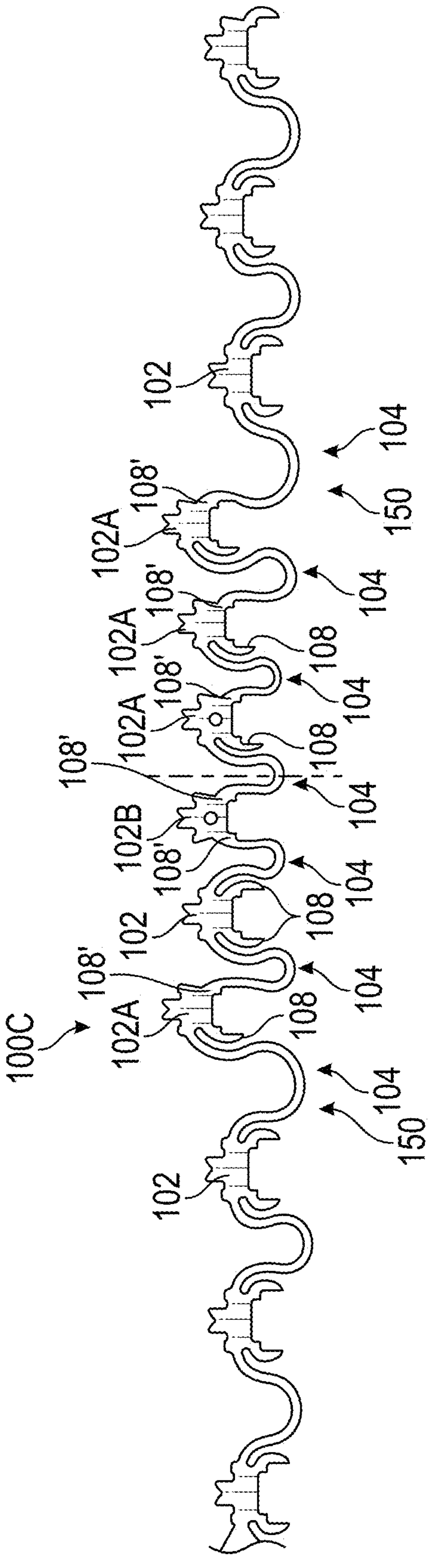
FIG. 7B illustrates another archform for overcrowding.

FIG. 7B illustrates an archform 100C, which can include any features described in reference to any other archform configuration described herein. Similar to the archform 100B, the archform 100C may be configured for a patient with crowded teeth, such as crowded anterior teeth. The archform 100C may include one or more connectors 102, one or more connectors 102A, and/or one or more connectors 102B with interproximal segments 104 disposed between adjacent connectors. The connectors of the archform 100C may be positioned at different positions in the occlusal-gingival direction. Some of the connectors may include features (e.g., holes, symbols, graphics, textures, markings, etc.) to assist a clinician with corresponding connectors of the archform with specific teeth. For example, the two connectors corresponding to the two teeth on either side of the patient's dental midline may each include a hole and/or another feature to indicate to a clinician that the two connectors correspond to the two teeth on either side of the dental midline.

Figure 8:
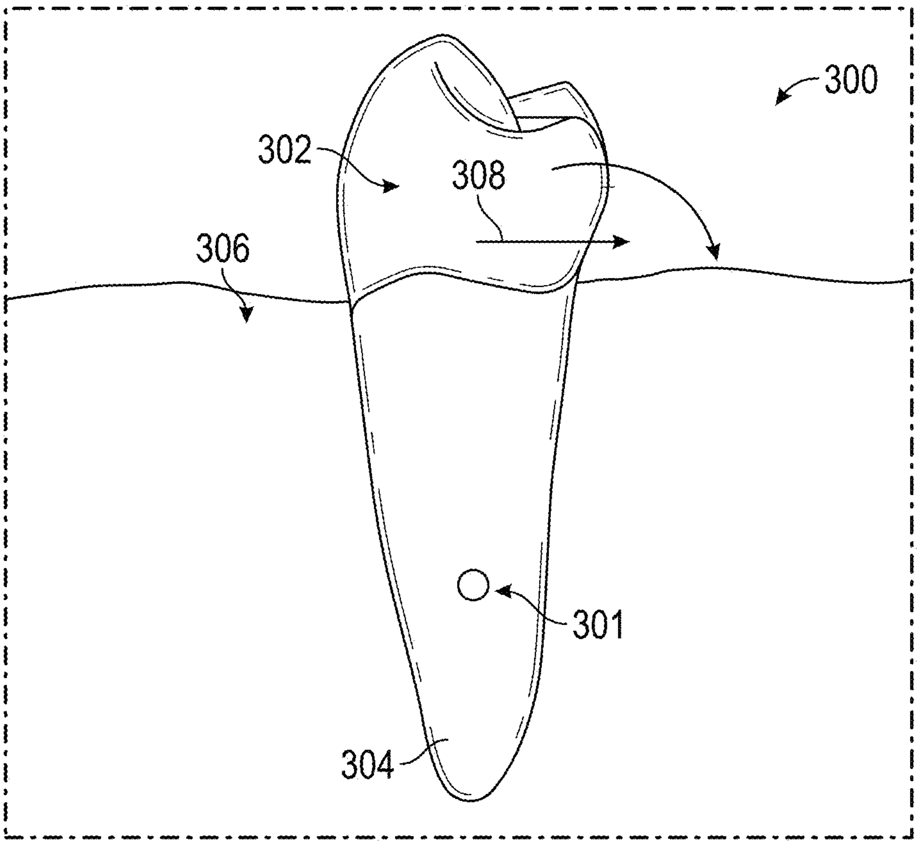
FIG. 8 illustrates a tooth.

FIG. 8 illustrates an example tooth 300. The tooth 300 may include a crown 302, which may correspond to the portion of the tooth 300 that protrudes out of a patient's gums 306. The tooth 300 may include a root 304, which may correspond to the portion of the tooth 300 that is disposed in a patient's gums 306. The root 304 may be disposed in a socket of the jaw bone and anchor the root 304 in position. The root 304 may constitute about two-thirds of the tooth 300 while the crown 302 may constitute about one-third. As described herein, a treatment plan may include moving one or more teeth of a patient. Accordingly, orthodontic brackets may be coupled to the crowns 302 of a patient's teeth and an archform coupled to the orthodontic brackets to apply forces 308 to the patient's teeth to move the teeth toward a planned alignment. In some variants, connectors of the archform may be directly coupled to the crowns 302 of a patient's teeth to apply forces 308 to the patient's teeth to move the teeth toward a planned alignment.

Because the forces 308 are directly applied to the crowns 302 and the teeth are anchored by the roots 304, the teeth may tip and/or rotate, which may be undesirable for a treatment plan. This tipping and/or rotating may result because the application of the force 308 at the crown 302 is distanced away (e.g., occlusally) from a center of resistance 301 of the tooth 300. The center of resistance 301 indicates a point for the tooth 300 that if the force 308 were applied at would result in no tipping and rotation of the tooth 300 about the long axis of the tooth 300. Accordingly, moving the application of the force 308 to or closer to the center of resistance 301 may result in less or even no unwanted tipping or rotating of the tooth 300 while the tooth 300 translates from the application of the force 308. As such, in some variants, an archform (e.g., connector of the archform) may include a hook (e.g., extension, peg, catch, pin, attachment portion). One or more elastics (e.g., springs, bands, nickel titanium springs, etc.) may be coupled to the hook to apply forces to the tooth 300 at or closer to the center of resistance 301, which may result in less or even no tipping or rotation of the tooth 300 while translating the tooth 300. The one or more elastics and hook may, in some instances, apply additional force to the tooth 300 to facilitate more efficient movement of the tooth 300 compared to without the hook and one or more elastics. The hooks described herein may be an integral part of the archforms described herein, which may include being cut from a sheet of material as part of cutting the archform from the sheet of material. In some variants, the hooks described herein may be coupled (e.g., bonded, welded, crimped, brazed) to an archform after the archform has been cut from a sheet of material.

Figure 9:
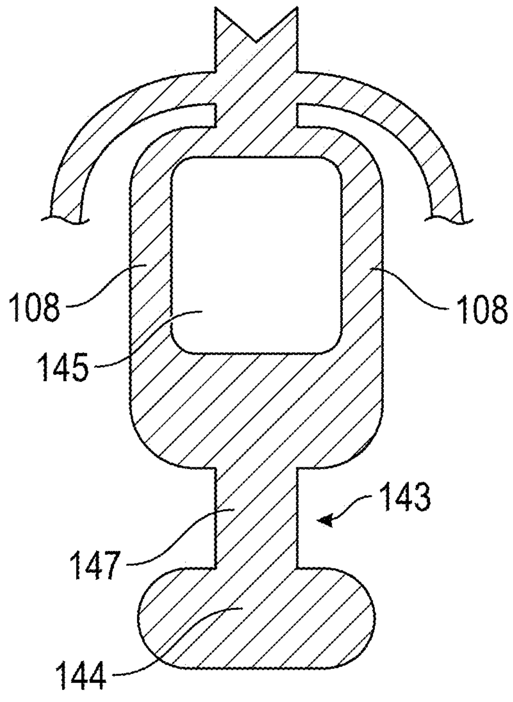
FIG. 9 illustrates a portion of an archform with a hook.

FIG. 9 illustrates a hook 143 (e.g., extension, peg, catch, pin, attachment portion) of an archform. The hook 143 can be part of a connector 102C, which may at least include any of the features described in reference to the other connectors described herein. The connector 102C may be part of any of the archforms described herein. The hook 143 may extend gingivally away from the connector 102C. The hook 143 may be directly connected to and extend gingivally from the two arms 108 of the connector 102C. In some variants, the hook 143 and other portions of the connector 102C (e.g., arms 108) may define a hole 145 (e.g., opening). The retainer 202 of the bracket 200 may be disposed in the hole 145 when the connector 102C and bracket 200 are coupled together, which can add to the rigidity of the hook 143 to withstand the forces applied by one or more elastics to the hook 143.

In some variants, the hook 143 may be directly connected to and extend gingivally from one of the two arms 108 and not the other. The hook 143 may include a neck 147 (e.g., extension, elongate portion, tongue). An enlarged end portion 144 (e.g., bulge, enlarged portion) may be disposed on an end portion of the neck 147. One or more elastics may be coupled to (e.g., disposed around) the neck 147. The enlarged end portion 144 may help to retain the one or more elastics on the hook 143. The one or more elastics may apply a force to the hook 143 at a position closer to or at the center of resistance 301 of a tooth to avoid excessive tipping and/or rotation of the tooth. One end of the one or more elastics may be coupled to the hook 143 coupled to a first tooth and the other end of the one or more elastics may be coupled to another hook 143 coupled to a second tooth, which can facilitate translating the first and second teeth closer together. The one or more elastics may be coupled to the hook 143 and another orthodontic appliance.

Figure 10:
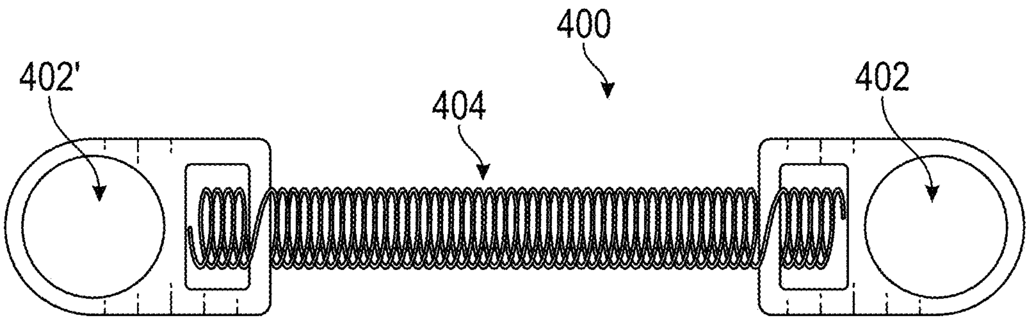
FIG. 10 illustrates a spring.

The one or more elastics may be a variety of devices, which can at least include springs (e.g., compression spring, helical compression spring, tension spring, extension spring, helical extension spring, coil spring, variable rate spring, linear rate spring, dual rate spring, conical spring, barrel spring, straight coil spring, hourglass shaped spring, continuous force spring, closing spring), bands (e.g., rubber bands), nickel titanium springs, wires, nickel titanium wires, etc. FIG. 10 illustrates an example of the one or more elastics—a spring 400. The spring 400 may be a nickel titanium tension spring. The spring 400 may provide a continuous force, which may improve comfort for the patient. The spring 400 may include eyelets 402, 402' (e.g., attachment portions, attachments, rings). The eyelets 402, 402' can be attached to the hooks described herein to apply a force to the hooks described herein. The spring 400 may include a coil 404 disposed between the eyelets 402, 402'. The coil 404 may provide the force that is applied to the hook(s).

Figure 11A:
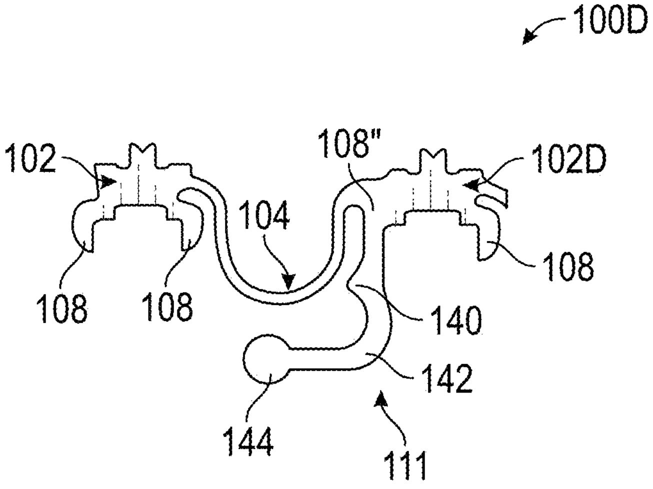
FIG. 11A illustrates a portion of an archform with a hook.

FIG. 11A illustrates a segment of an archform 100D, which can include any features described in reference to any other archform configuration described herein. The archform 100D may include a connector 102D, which may at least include any of the features described in reference to the other connectors described herein. The connector 102D may include two arms, which can include an arm 108 and an arm 108". A hook 111 (e.g., extension, peg, catch, pin, attachment portion) can be directly connected to and extend from the arm 108". For example, the hook 111 can extend gingivally from the arm 108". The hook 111 may extend gingivally from the arm 108" to a curved portion 142 and then in a mesial-distal direction. The arm 108' and the portion of the hook 111 extending in the mesial-distal direction may be arranged transversely (e.g., perpendicularly) relative to each other. The hook 111 may include an enlarged end portion 144 (e.g., bulge, enlarged portion) that may help to retain the one or more elastics on the hook 111. One or more elastics may be disposed around the hook 111 (e.g., around the curved portion 142) to exert a force on the hook 111. In some variants, the arms 108" may be wider in a mesial-distal direction compared to arms 108, which may increase the rigidity of the arm 108" to tolerate the forces applied thereon by one or more elastics.

Figure 11B:
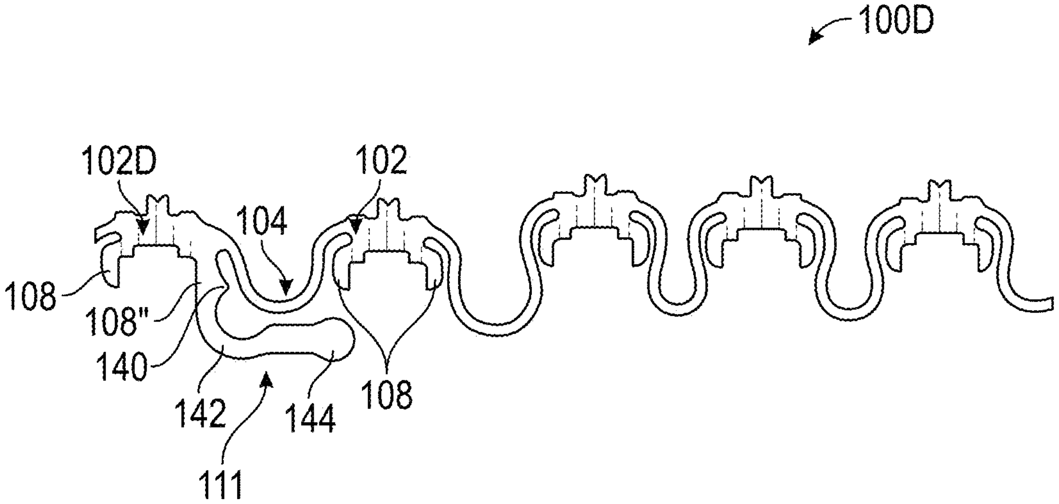
FIG. 11B illustrates a portion of an archform with a hook.

The hook 111 may include a protrusion 140 (e.g., tab, flange, protuberance, projection, jut out, kick out, secondary hook, tooth). The protrusion 140 may extend in the direction of the enlarged end portion 144. The protrusion 140 may extend in the direction opposite the enlarged end portion 144. The protrusion 140 may help to prevent the one or more elastics from moving (e.g., sliding, riding) occlusally along the arm 108' toward the junction between the connector 102D and the adjacent interproximal segment 104. For example, one of the eyelets 402, 402' can be disposed around the hook 111, which can include being disposed around the curved portion 142. The protrusion 140 can prevent the one of the eyelets 402, 402' from moving occlusally along the arm 108' toward the junction between the connector 102D and the adjacent interproximal segment 104. The enlarged end portion 144 can prevent the one of the eyelets 402, 402' from decoupling from the hook 111. FIG. 11A shows the hook 111 extending from the curved portion 142 toward one of the mesial or distal directions and FIG. 11B shows the hook 111 extending from the curved portion 142 toward the other of the mesial or distal directions. The archform 100D can include at least two connectors 102D—one with the hook 111 oriented as in FIG. 11A and the other with the hook 111 oriented as in FIG. 11B. An elastic, such as the spring 400, can be coupled to the two hooks 111 to move the two teeth coupled, respectively, to the two connectors 102D closer together.

When the connectors 102D are coupled to the orthodontic brackets, the hooks 111 can be disposed proximate the orthodontic brackets, which can add to the rigidity of the hooks 111 to resist the forces applied by the one or more elastics. In some variants, the hooks 111 may contact the retainers 202 of the orthodontic brackets to provide additional rigidity to the hooks 111.

Figure 12A:
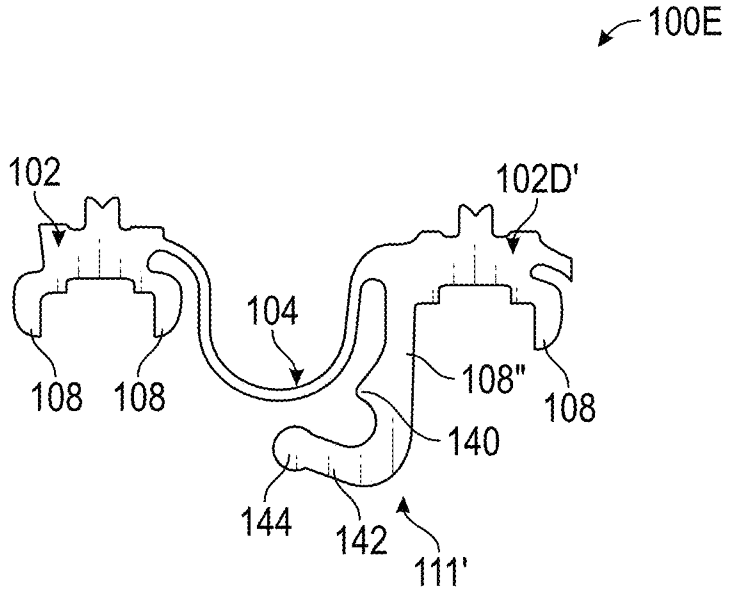
FIG. 12A illustrates a portion of an archform with a hook.
Figure 12B:
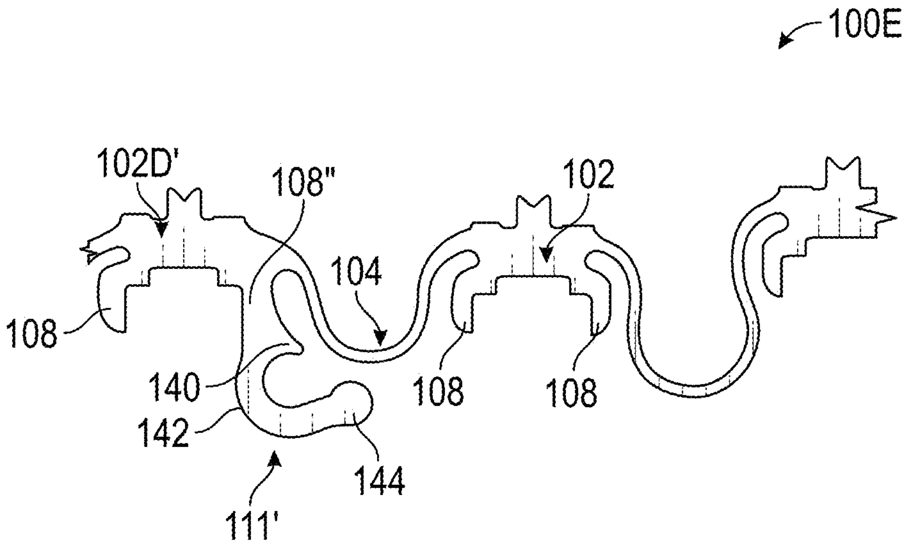
FIG. 12B illustrates a portion of an archform with a hook.

FIG. 12A illustrates a segment of an archform 100E, which can include any features described in reference to any other archform configuration described herein. The archform 100E may include a connector 102D', which may at least include any of the features described in reference to the other connectors described herein. The connector 102D' may include two arms, which can include an arm 108 and an arm 108". A hook 111' (e.g., extension, peg, catch, pin, attachment portion) can be directly connected to and extend from the arm 108". For example, the hook 111' can extend gingivally from the arm 108". The hook 111' may extend gingivally from the arm 108" to a curved portion 142 and then in an occlusal direction and mesial-distal direction. The hook 111' may include an enlarged end portion 144 (e.g., bulge, enlarged portion) that may help to retain the one or more elastics on the hook 111'. One or more elastics may be disposed around the hook 111' (e.g., around the curved portion 142) to exert a force on the hook 111'. The hook' 111 may include a protrusion 140 (e.g., tab, flange, protuberance, projection, jut out, kick out, secondary hook, tooth). The protrusion 140 may extend in the direction of the enlarged end portion 144. The protrusion 140 may extend in the direction opposite the enlarged end portion 144. The protrusion 140 may help to prevent the one or more elastics from moving (e.g., sliding, riding) occlusally toward the junction between the connector 102D' and the adjacent interproximal segment 104. For example, one of the eyelets 402, 402' can be disposed around the hook 111', which can include being disposed around the curved portion 142. The protrusion 140 can prevent the one of the eyelets 402, 402' from moving occlusally along the arm 108' toward the junction between the connector 102D' and the adjacent interproximal segment 104. The enlarged end portion 144 can prevent the one of the eyelets 402, 402' from decoupling from the hook 111'. FIG. 12A shows the hook 111' extending from the curved portion 142 toward the occlusal direction and one of the mesial or distal directions and FIG. 12B shows the hook 111 extending from the curved portion 142 toward the occlusal direction and the other of the mesial or distal directions. The archform 100E can include at least two connectors 102D'—one with the hook 111' oriented as in FIG. 12A and the other with the hook 111' oriented as in FIG. 12B. An elastic, such as the spring 400, can be coupled to the two hooks 111' to move the two teeth coupled, respectively, to the two connectors 102D' closer together.

Figure 13:
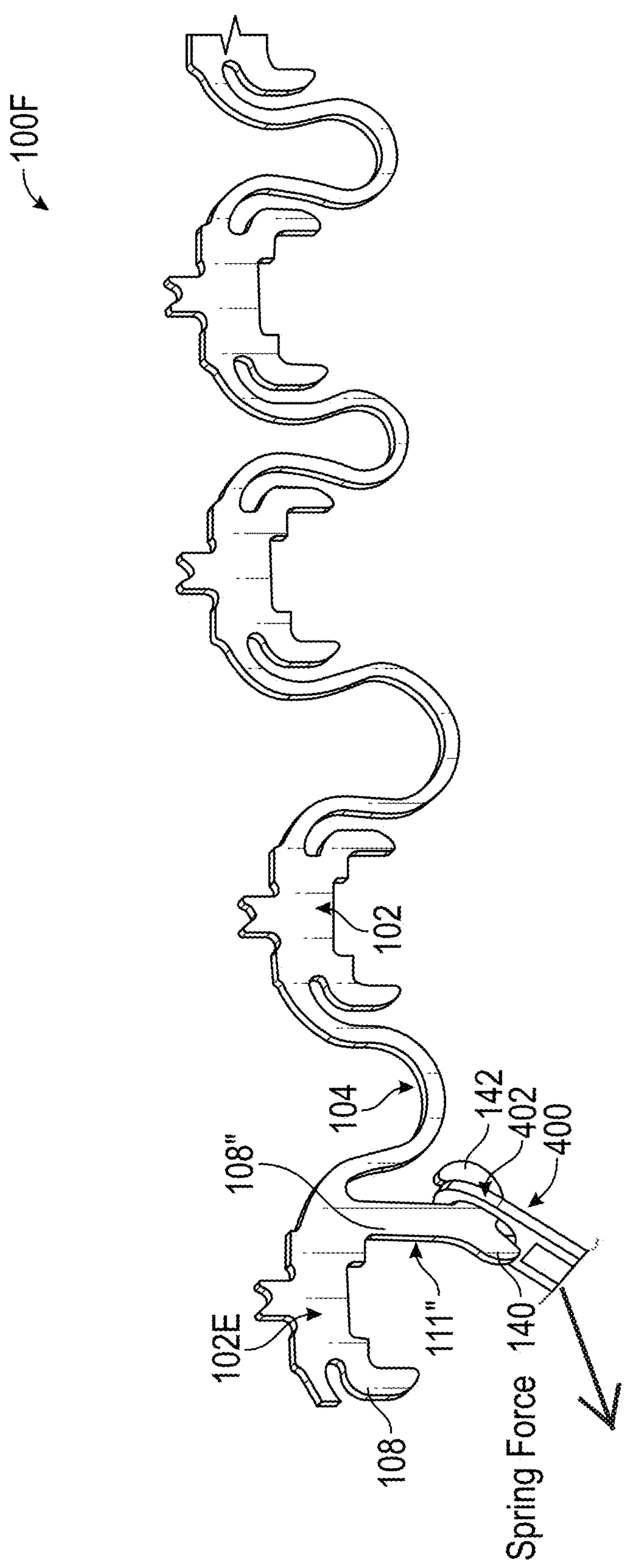
FIG. 13 illustrates an archform with a hook.

FIG. 13 illustrates a segment of an archform 100F, which can include any features described in reference to any other archform configuration described herein. The archform 100F may include a connector 102E, which may at least include any of the features described in reference to the other connectors described herein. The connector 102E may include two arms, which can include an arm 108 and an arm 108". A hook 111" (e.g., extension, peg, catch, pin, attachment portion) can be directly connected to and extend from the arm 108". For example, the hook 111" can extend gingivally from the arm 108". The hook 111" may extend gingivally from the arm 108" to a curved portion 142 that curves in an occlusal direction and in one of a mesial or distal direction. The hook 111" may include a protrusion 140 (e.g., tab, flange, protuberance, projection, jut out, kick out, secondary hook, tooth). The protrusion 140 may extend in a direction that is opposite the curved portion 142. The protrusion 140 may extend in the other of the mesial or distal direction and in the gingival direction. One or more elastics may be disposed around the hook 111" (e.g., around the curved portion 142) to exert a force on the hook 111" to move one or more teeth. The elastic can be disposed around the curved portion 142 and contact the protrusion 140. The protrusion 140 may help to prevent the elastic from moving (e.g., sliding, riding) in the occlusal direction on the arm 108" toward the junction between the connector 102E and the adjacent interproximal segment 104. For example, the eyelet 402 of the spring 400 can be disposed around the hook 111" (e.g., the curved portion 142) and contact the protrusion 140. The eyelet 402' of the spring 400 can be disposed around the hook 111" of another connector 102E or another orthodontic appliance. The one or more elastics (e.g., eyelet 402) can contact the protrusions 140 to bend (e.g., load) the one or more elastics.

In some variants, the force from the one or more elastics (e.g., spring 400) on the hook 111" can cause the tooth to which the hook 111" is coupled to not only translate but to also tip, which can at least be due to root drag. The reaction force from the hook 111" to the force applied by the one or more elastics can be occlusal to the center of resistance (e.g., moment of resistance) of the tooth, which can contribute to the tipping of the tooth. However, the one or more elastics (e.g., spring 400) can contact the protrusion 140 to apply a force to the protrusion 140 that counteracts the tipping of the tooth. The one or more elastics can bend around the protrusion 140, applying a force thereto. For example, the potential energy of the loaded (e.g., bent) elastic against the protrusion 140 can counteract the tipping of the tooth as the elastic applies a force to the hook 111" to translate the tooth. With the spring 400, the eyelet 402 may be disposed around the curved portion 142 of the hook 111" and pulled against the protrusion 140, or another portion of the spring 400 (e.g., structure proximate the eyelet 402, frame of eyelet 402, etc.), by the spring force of the spring 400 when the eyelet 402' is coupled to another hook 111" on another connector 102E of the archform 100F.

In some variants, the interproximal segments can have multiple members spanning between adjacent connectors 102. Each member can exert a force on the adjacent connectors 102, which may provide increased orthodontic forces compared to an interproximal segment with a single member spanning between two adjacent connectors 102. Any of the archforms described herein can include one or more interproximal segments with multiple members connected to and spanning between adjacent connectors 102.

Figure 14A:
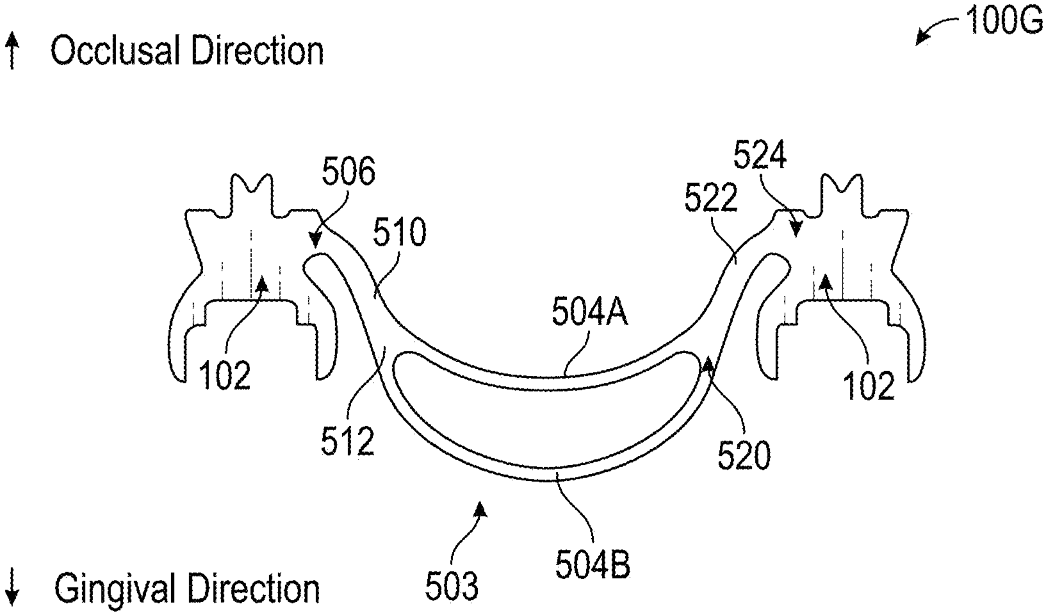
FIG. 14A illustrates a portion of an archform with multiple interproximal members.
Figure 14B:
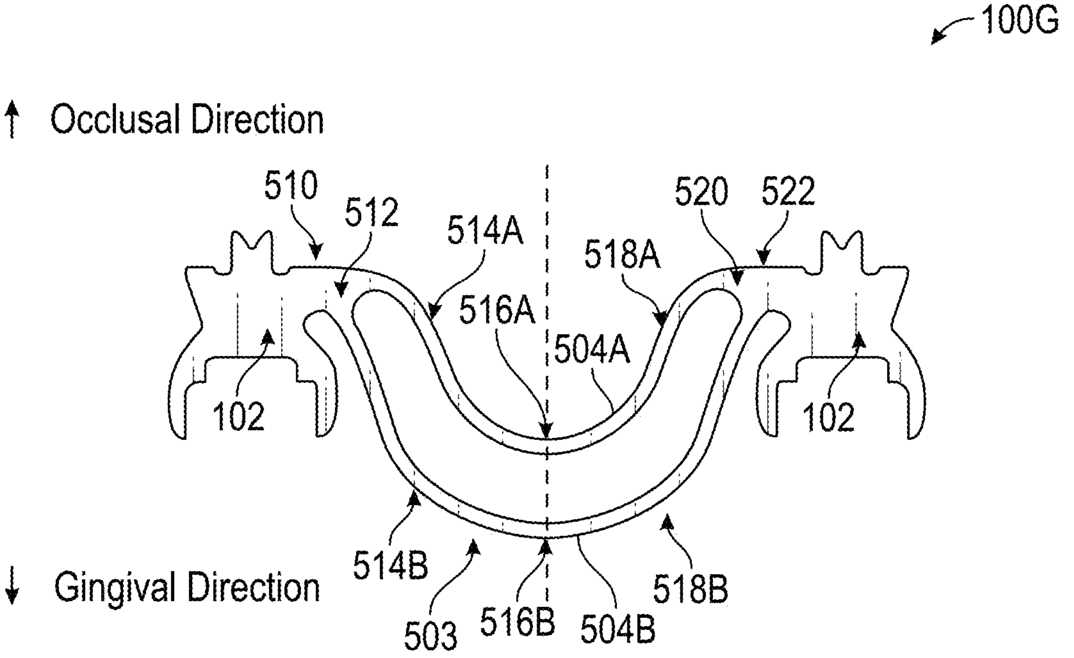
FIG. 14B illustrates a portion of an archform with multiple interproximal members.
Figure 14C:
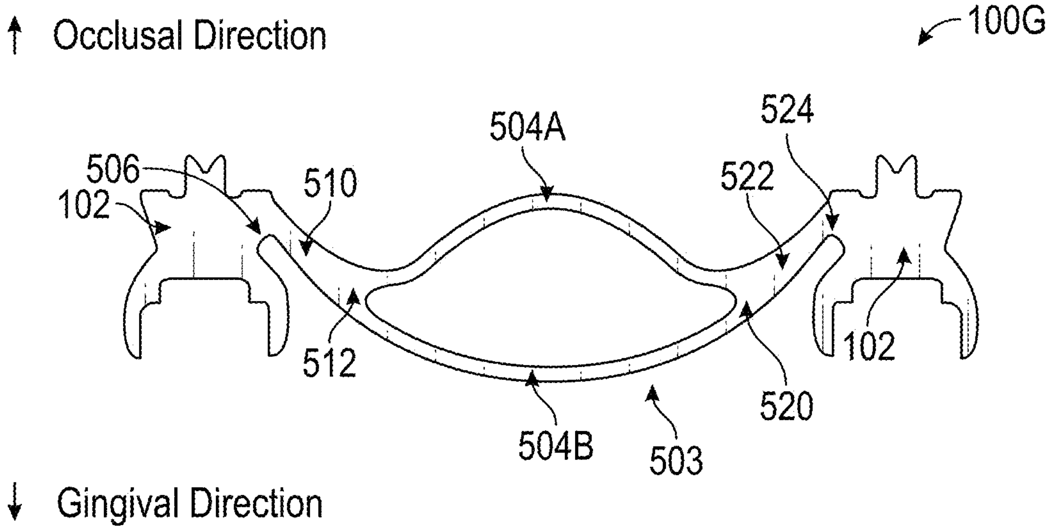
FIG. 14C illustrates a portion of an archform with multiple interproximal members.

FIGS. 14A-14C depict a portion of an archform 100G having two connectors 102 with an interproximal segment 503 spanning between the two connectors 102. The interproximal segment 503 can include multiple members spanning between adjacent connectors 102. For example, the interproximal segment 503 can include an occlusal interproximal member 504A and a gingival interproximal member 504B. The interproximal segment 503 can include a first portion 510 extending from a first connector 102 to a divergence point 512, which may also be described as a fork, junction, and/or split. The interproximal segment 503 can diverge at the divergence point 512 into the occlusal interproximal member 504A and the gingival interproximal member 504B. The occlusal interproximal member 504A and gingival interproximal member 504B each may exert a force on the adjacent connectors 102. The occlusal interproximal member 504A and gingival interproximal member 504B are depicted with the occlusal interproximal member 504A more occlusal than the gingival interproximal member 504B, however the relative positions of the two or more interproximal members 503 can vary to achieve planned teeth positioning. Before meeting the second connector 102, the occlusal interproximal member 504A and gingival interproximal member 504B can rejoin at a convergence point 520, which may also be described as a junction. After the convergence point 520, the interproximal segment 503 can connect to the second connector 102 by way of a second portion 522. As shown in FIG. 14A, the first portion 510 of the interproximal segment 503 may connect to a first connector 102 at a first connection 506 (e.g., junction). Similarly, the second portion 522 may connect to a second connector 102 at a second connection 524 (e.g., junction). The interproximal segment 503 may span the gap between the two adjacent connectors 102 (e.g., the first and the second connectors 102). The interproximal segment 503 may include two or more members which diverge and converge along the length of the interproximal segment 503 between the first and second connectors 102. The interproximal segment 503 may include an occlusal interproximal member 504A and a gingival interproximal member 504B between the first portion 510 and the second portion 522. The divergence point 512 can be gingival relative to the first connection 506. The convergence point 520 can be gingival relative to the second connection 524. The interproximal segment 503 may extend gingivally by way of the first portion 510 at the first connector 506 to the divergence point 512. The interproximal segment 503 may split into two members at the divergence point 512, which may include an occlusal interproximal member 504A and gingival interproximal member 504B. The occlusal interproximal member 504A and gingival interproximal member 504B may curve gingivally and then occlusally to rejoin at a convergence point 520. The occlusal interproximal member 504A can be positioned occlusally relative to the gingival interproximal member 504B. The occlusal interproximal member 504A and gingival interproximal member 504B can define an opening therebetween. The occlusal interproximal member 504A and gingival interproximal member 504B can be spaced apart from each other in the gingival-occlusal direction.

Various physical features of the interproximal segment 503 can be modified to effectuate different orthodontic forces. The gingival-occlusal thickness and/or buccal-lingual thickness of the interproximal segment 503 may vary across the length(s) of the interproximal members 504A, 504B, the first portion 510, and/or second portion 522, and may be different for the occlusal interproximal member 504A in comparison to the gingival interproximal member 504B. As the interproximal members 504A, 504B extend from the first connector 102 to the second connector 102, they may have different radii of curvature, which may affect the vector of force exerted by each of the interproximal members 504A, 504B. The length of the first portion 510 and second portion 522 which define the location of the divergence point 512 and convergence point 520 for the interproximal members 504A, 50B may vary in length, which may include each portion being the same length or the portions being different lengths. The first portion 510 may be dimensioned such that the location of the divergence point 512 in the gingival-occlusal direction is substantially the same as the location of the first connection 506, as shown in FIG. 14B, where the first portion 510 and second portion 522 are shorter than the first portion 510 and second portion 522 as depicted in FIG. 14A. Similarly, the second portion 522 may be dimensioned such that the location of the convergence point 520 is substantially the same as the location of the second connection 524 where the interproximal segment 503 joins the second connector 102. The first portion 510 may be of a different length than the second portion 522, such that the occlusal intermediate point 516A and gingival intermediate point 516B may not be at the midpoint between the first and second connectors 102. One connector 102 can be located more occlusal than the other connector 102, such as the connectors 102 in FIG. 14C. An interproximal segment 503 may include a double loop 152 (e.g., as shown in FIG. 6A), which may also be referred to as a W-loop, such that only one, only two, or more than two of the interproximal members 504A, 504B between the first connector 102 and the second connector 102 are double loops 152. As such, an occlusal interproximal member 504A and/or a gingival interproximal member 504B may be double loop(s) 152.

The first portion 510 or second portion 522 can join a connector 102 at various portions. In some variants, the point where a first portion 510 or second portion 522 joins a connector 102 can be at an arm 108, proximal to the contact surface 114, on a buccal surface of the connector 102, or on other positions of the connector 102 as desired or required. The interproximal segment 503 can be directly connected to the arm 108, as opposed to being directly connected to a portion of the connector 102 that is occlusal relative to, or proximal to, the arm 108. In some variants, the interproximal segment 503 may be directly connected to and extend gingivally from a gingival portion of the arm 108. The interproximal segment 503 may extend gingivally away from the arm 108. In some variants, the arms 108 can be directly connected to interproximal segment 503, which may increase a width of the arm(s) 108 in a mesial-distal direction, which can increase a rigidity of the arm(s) 108. The outer profile of the arm(s) 108 and the interproximal segment 503 may be continuous. By the interproximal segment 503 extending gingivally from and connected to the arm(s) 108 instead of from a position occlusal of the arm(s) 108, the width of the connector(s) 102 in the substantially mesial-distal direction may be decreased. The width of an occlusal portion of the connector 102 may similarly be decreased. The interproximal segment 503 may join the connector(s) 102 at a point on a buccal surface of the connector(s) 102, which may be beneficial in an overcrowded environment.

As depicted in FIG. 14A, both the occlusal interproximal member 504A and the gingival interproximal member 504B can curve in a gingival direction. The interproximal members 504A, 504B may curve in an occlusal direction The interproximal members 504A, 504B may curve in the same direction. The interproximal members 504A, 504B may curve in different directions. The occlusal interproximal member 504A can curve in an occlusal direction. As illustrated in FIG. 14C, the occlusal interproximal member 504A may curve in an occlusal direction and the gingival interproximal member 504B may curve in a gingival direction. The occlusal interproximal member 504A may extend (e.g., curve) occlusally from the divergence point 512 to an occlusal-most position and then extend (e.g., curve) gingivally to the convergence point 520. The gingival interproximal member 504B may extend (e.g., curve) gingivally from the divergence point 512 to a gingival-most position and then extend (e.g., curve) occlusally to the convergence point 520. The occlusal interproximal member 504A may extend (e.g., curve) occlusally from the divergence point 512 to an occlusal-most position and then extend (e.g., curve) gingivally to a gingival-most position and then extend (e.g., curve) occlusally to the convergence point 520. The gingival interproximal member 504B may extend (e.g., curve) occlusally from the divergence point 512 to an occlusal-most position and then extend (e.g., curve) gingivally to a gingival-most position and then extend (e.g., curve) occlusally to the convergence point 520.

In some variants, the occlusal interproximal member 504A and the gingival interproximal member 504B may be the same size and/or shape. In some variants, the occlusal interproximal member 504A and the gingival interproximal member 504B may be different sizes and/or shapes. In some variants, the radius of curvature of one of the occlusal interproximal member 504A or the gingival interproximal member 504B can be larger than the radius of curvature of the other of the occlusal interproximal member 504A or the gingival interproximal member 504B. In some variants, the curvature of one of the occlusal interproximal member 504A or the gingival interproximal member 504B can be less than the curvature of the other of the occlusal interproximal member 504A or the gingival interproximal member 504B. In some variants, the occlusal interproximal member 504A and the gingival interproximal member 504B can have differing thicknesses in the occlusal-gingival direction and/or buccal-lingual direction.

In some variants, the occlusal interproximal member 504A may include a first occlusal portion 514A that extends (e.g., curves) in a gingival direction from the divergence point 512 to an occlusal intermediate point 516A as shown in FIG. 14B. The first occlusal portion 514A may alternatively extend (e.g., curve) in an occlusal direction from the divergence point 512 to an occlusal intermediate point 516A. The occlusal intermediate point 516A may be disposed gingivally relative to the divergence point 512. The occlusal interproximal member 504A may include a second occlusal portion 518A that extends (e.g., curves) in an occlusal direction from the occlusal intermediate point 516A to a convergence point 520, where the occlusal interproximal member 504A can meet the gingival interproximal member 504B. The second occlusal portion 518A may alternatively extend (e.g., curve) in a gingival direction from the occlusal intermediate point 516A to a convergence point 520. The occlusal intermediate point 516A may be the connection between the first occlusal portion 514A and the second occlusal portion 518A and define the midpoint of the occlusal interproximal member 504A. The occlusal intermediate point 516A may be the gingival-most point along the occlusal interproximal member 504A. The occlusal intermediate point 516A may be the occlusal-most point along the occlusal interproximal member 504A. The occlusal intermediate point 516A and/or gingival intermediate point 516B can be gingival relative to the divergence point 512 and/or convergence point 520. The occlusal intermediate point 516A and/or gingival intermediate point 516B can be occlusal relative to the divergence point 512 and/or convergence point 520. The occlusal intermediate point 516A and/or gingival intermediate point 516B may be more mesial or distal relative to a halfway position between adjacent connectors 102.

The gingival interproximal member 504B may include a first gingival portion 514B that extends (e.g., curves) in a gingival direction from the divergence point 512 to a gingival intermediate point 516B. The first gingival portion 514B may alternatively extends (e.g., curve) in an occlusal direction from the divergence point 512 to a gingival intermediate point 516B. The gingival intermediate point 516B may be disposed gingivally relative to the divergence point 512. The gingival interproximal member 504B may include a second gingival portion 518B that extends (e.g., curves) in an occlusal direction from the gingival intermediate point 516B to a convergence point 520, where the gingival interproximal member 504B can meet the occlusal interproximal member 504A. The second gingival portion 518B may alternatively extend (e.g., curve) in a gingival direction from the gingival intermediate point 516B to a convergence point 520. The gingival intermediate point 516B may be the connection between the first gingival portion 514B and the second gingival portion 518B and define the midpoint of the gingival interproximal member 504B. The gingival intermediate point 516B may be the gingival-most point along the gingival interproximal member 504B. The gingival intermediate point 516B may be the occlusal-most point along the gingival interproximal member 504B.

The archform 100G utilizing an interproximal segment 503 with two or more interproximal members can utilize other connectors 102 as disclosed herein, such as connector 102A configured for crowded teeth, connector 102B configured for crowded teeth, connector 102C which additionally comprises a hook, connector 102D which additionally comprises a hook, connector 102D' which additionally comprises a hook, and/or any other connectors described herein.

In some variants, the interproximal segment 503 may have a lingual-buccal width that varies as the interproximal segment 503 progresses from a first connector 102 to the second connector 102. In some variants, the occlusal interproximal member 504A and gingival interproximal member 504B of the interproximal segment 503 may have their lingual-buccal width vary in the occlusal-gingival direction. In some variants, one or both of the occlusal interproximal member 504A and gingival interproximal member 504B may have a different lingual-buccal width across their occlusal-most surface than across their gingival-most surface. The occlusal interproximal member 504A and gingival interproximal member 504B may have the same width at any mesial-distal position between the first and second connector 102. In some variants, the occlusal interproximal member 504A may have a different width than the gingival interproximal member 504B at one or more mesial-distal positions between the first and second connectors 102. Similarly, the thicknesses of the occlusal interproximal member 504A and gingival interproximal member 504B in the gingival-occlusal direction may vary as the interproximal members 504A, 504B progress between adjacent connectors 102. In some variants, either one or both of the occlusal interproximal member 504A and/or the gingival interproximal member 504B may have a varying occlusal-gingival height as the occlusal interproximal member 504A and/or the gingival interproximal member 504B progress from the first connector 102 to the second connector 102.

In some variants, the occlusal interproximal member 504A and/or the gingival interproximal member 504B may be configured such that during a treatment plan they may contact at a point between the divergence point 512 and the convergence point 520. The gingival interproximal member 504B can include a cross-section in a plane extending in the buccal-lingual direction to accommodate at least a part of the occlusal interproximal member 504A during treatment. The gingival interproximal member 504B may be configured to accommodate all of the occlusal interproximal member 504A, more than all of the occlusal interproximal member 504A, or only a portion of the occlusal interproximal member 504A. The occlusal interproximal member 504A can include a cross-section in a plane extending in the buccal-lingual direction to accommodate at least a part of the gingival interproximal member 504B during treatment. The occlusal interproximal member 504A may be configured to accommodate all of the gingival interproximal member 504B, more than all of the gingival interproximal member 504B, or only a portion of the gingival interproximal member 504B.

In some variants, the occlusal interproximal member 504A and/or gingival interproximal member 504B can have features (e.g., void(s), recess(es), groove(s), channel(s)) such that the occlusal interproximal member 504A can receive the gingival interproximal member 504B and/or the gingival interproximal member 504B can receive the occlusal interproximal member 504A.

In some variants, an interproximal member may extend in a substantially more lingual-buccal direction than in an occlusal-gingival direction. In some variants, an interproximal member may extend in a substantially more lingual-buccal direction than in a mesial-distal direction. The interproximal member may include a buccal interproximal member and a lingual interproximal member, which may include features similar to variants of the occlusal interproximal member 504A and gingival interproximal member 504B. The buccal and lingual interproximal members can be offset from each other in a lingual-buccal direction. Variants utilizing a buccal interproximal member and a lingual interproximal member can include any features described in reference to any other archform configurations described herein. In some variants, the orientation of the interproximal members can be flipped in the occlusal-gingival direction relative to other variants of interproximal members described herein. In some variants, the interproximal members may be rotated around an axis following the dental arch's curvature, such that if another feature referred to the occlusal direction, then embodiments utilizing an interproximal member would have that feature refer to a lingual direction. The interproximal members each may exert a force between the adjacent connectors 102 in a similar fashion to other interproximal members disclosed herein.

It is intended that the scope of this present invention herein disclosed should not be limited by the particular disclosed embodiments described above. This invention is susceptible to various modifications and alternative forms, and specific examples have been shown in the drawings and are herein described in detail. This invention is not limited to the detailed forms or methods disclosed, but rather covers all equivalents, modifications, and alternatives falling within the scope and spirit of the various embodiments described and the appended claims. Various features of the orthodontic brackets and archforms described herein can be combined to form further embodiments, which are part of this disclosure.

Methods of using the orthodontic brackets and/or archforms (including device(s), apparatus(es), assembly(ies), structure(s) or the like) are included herein; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "tying a tie onto an orthodontic bracket" includes "instructing the tying of a tie onto an orthodontic bracket." The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. An archform for moving teeth of a patient, the archform comprising:

a first connector and a second connector, the first connector and the second connector configured to be coupled to first and second brackets disposed on the teeth of the patient such that the archform does not slide relative to the first and second brackets, the first connector comprising a pair of arms configured to be disposed on mesial and distal sides of the first bracket; and an interproximal segment disposed between and connecting the first connector and the second connector, the interproximal segment comprising a double loop, the double loop comprising a first loop and a second loop;

wherein the first loop comprises a first portion and a second portion, the first portion of the first loop extending in a gingival direction from the first connector to a first gingival point, and the second portion of the first loop extending in an occlusal direction from the first gingival point to an intermediate point;

wherein the second loop comprises a first portion and a second portion, the first portion of the second loop extending in the gingival direction from the intermediate point to a second gingival point, and the second portion of the second loop extending in the occlusal direction from the second gingival point to the second connector; and wherein the first portion of the first loop extends gingivally from a portion of the first connector that is occlusally positioned relative to one arm of the pair of arms such that at least a portion of the first portion of the first loop is positioned occlusally of the one arm of the pair of arms.

2. The archform of claim 1, wherein the first loop and the second loop are open in an occlusal direction.

3. The archform of claim 1, wherein the intermediate point is gingivally positioned relative to the first connector and the second connector.

4. The archform of claim 1, wherein the intermediate point is gingivally positioned relative to an occlusal half of the first connector and the second connector.

5. The archform of claim 1, wherein the intermediate point is gingivally positioned relative to arms of the first connector and the second connector.

6. The archform of claim 1, wherein the first and second gingival points are gingivally positioned relative to the first connector and the second connector.

7. The archform of claim 1, wherein the first and second gingival points are gingivally positioned relative to midlines of the first connector and the second connector, the midlines extending in a mesial-distal direction.

8. The archform of claim 1, wherein the first and second gingival points are gingivally positioned relative to arms of the first connector and the second connector.

9. The archform of claim 1, wherein the intermediate point is occlusally positioned relative to the first gingival point and the second gingival point.

10. The archform of claim 1, wherein the first connector comprises a pair of arms configured to be disposed on mesial and distal sides of the first bracket, and wherein the first portion of the first loop extends gingivally from a distal portion of one arm of the pair of arms, the distal portion of the one arm distal to the first connector relative to a proximal portion of the one arm, the proximal portion connected to the first connector.

11. The archform of claim 1, further comprising a third connector, the third connector comprising a hook configured to be coupled with one or more elastics to apply forces to the patient's teeth, the third connector extending from and connected directly to the first connector or the second connector.

12. The archform of claim 1, wherein the interproximal segment comprises at least one of an occlusal interproximal member disposed occlusally of the double loop and a gingival interproximal member disposed gingivally of the double loop.

13. The archform of claim 1, wherein the first loop continuously curves from the first connector to the intermediate point such that no portion of the first loop from the first connector to the intermediate point is straight, and the second loop continuously curves from the intermediate point to the second connector such that no portion of the second loop from the intermediate point to the second connector is straight.

14. The archform of claim 13, wherein the first loop and the second loop comprise variable curvatures along their lengths.

15. An archform for moving teeth of a patient, the archform comprising:

a first connector and a second connector, the first connector and the second connector configured to be coupled to first and second brackets disposed on the teeth of the patient such that the archform does not slide relative to the first and second brackets; and an interproximal segment disposed between and connecting the first connector and the second connector, the interproximal segment comprising at least two interproximal members;

wherein the at least two interproximal members comprise an occlusal interproximal member and a gingival interproximal member, the occlusal interproximal member and the gingival interproximal member having a space between the occlusal interproximal member and the gingival interproximal member in an occlusal-gingival direction.

16. The archform of claim 15, wherein a first portion of the interproximal segment extends from the first connector and diverges at a divergence point into the occlusal interproximal member and the gingival interproximal member, wherein the occlusal interproximal member and the gingival interproximal member meet at a convergence point along the interproximal segment, and wherein a second portion of the interproximal segment connects the convergence point to the second connector.

17. The archform of claim 16, wherein the divergence point and the convergence point are separated by the space extending in a mesial-distal direction.

18. The archform of claim 15, wherein at least one of the occlusal interproximal member and the gingival interproximal member comprises a double loop.

19. The archform of claim 15, wherein the occlusal interproximal member and the gingival interproximal member form a closed loop around the space.

20. The archform of claim 15, wherein the occlusal interproximal member and the gingival interproximal member extend proximate each other in a mesial-distal direction to connect the first connector to the second connector.

* * * * *